US012495203B2

(12) United States Patent
Peng

(10) Patent No.: US 12,495,203 B2
(45) Date of Patent: Dec. 9, 2025

(54) METHOD AND APPARATUS FOR PERFORMING CONTROL OPERATION, STORAGE MEDIUM, AND CONTROL

(71) Applicant: Huawei Technologies Co., Ltd., Shenzhen (CN)

(72) Inventor: Min Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 18/264,275

(22) PCT Filed: Jan. 21, 2022

(86) PCT No.: PCT/CN2022/073128
§ 371 (c)(1),
(2) Date: Aug. 4, 2023

(87) PCT Pub. No.: WO2022/166614
PCT Pub. Date: Aug. 11, 2022

(65) Prior Publication Data
US 2024/0129619 A1    Apr. 18, 2024

(30) Foreign Application Priority Data
Feb. 4, 2021   (CN) .......................... 202110156814.4

(51) Int. Cl.
H04N 23/63        (2023.01)
G06F 3/04847      (2022.01)
H04N 23/62        (2023.01)
H04N 23/667       (2023.01)

(52) U.S. Cl.
CPC ....... *H04N 23/631* (2023.01); *G06F 3/04847* (2013.01); *H04N 23/62* (2023.01); *H04N 23/667* (2023.01)

(58) Field of Classification Search
CPC .... H04N 23/631; H04N 23/62; H04N 23/667; H04N 23/611; H04N 5/268; H04N 23/64; H04N 23/69; H04N 23/60; G06F 3/04847; G06F 3/0482; G06F 3/04842; G06F 9/451; G06F 16/53; G06F 3/0488; G06F 3/04817; G06F 3/0484; A61B 5/1116;
(Continued)

(56) References Cited

U.S. PATENT DOCUMENTS

| 5,760,760 A | * | 6/1998 | Helms | ...................... G09G 3/36 345/207 |
| 2014/0226053 A1 | * | 8/2014 | Winer | .................. H04N 23/667 348/333.05 |
| 2018/0176478 A1 | * | 6/2018 | Kim | ...................... G06F 16/583 |

FOREIGN PATENT DOCUMENTS

| CN | 106610808 A | 5/2017 |
| CN | 107239207 A | 10/2017 |
| CN | 108540722 A | 9/2018 |

(Continued)

*Primary Examiner* — Christopher K Peterson
(74) *Attorney, Agent, or Firm* — Conley Rose, P.C.

(57) ABSTRACT

A method includes detecting a trigger operation of a user on a control on a first interface of the terminal device, where the control is used to obtain target data; and in response to the trigger operation of the user, performing a first action and a second action that correspond to the control, where the first action is used to open and display a second interface, and the second action is used to obtain, through matching, information that is on the second interface and that is related to the target data.

20 Claims, 10 Drawing Sheets

(58) Field of Classification Search
CPC .... A61B 2503/12; G03B 15/00; G03B 17/00; G03B 17/56
See application file for complete search history.

(56) References Cited

FOREIGN PATENT DOCUMENTS

| | | |
|---|---|---|
| CN | 109660588 A | 4/2019 |
| CN | 110266879 A | 9/2019 |
| CN | 112101933 A | 12/2020 |

\* cited by examiner

METHOD AND APPARATUS FOR PERFORMING CONTROL OPERATION, STORAGE MEDIUM, AND CONTROL

CROSS-REFERENCE TO RELATED APPLICATIONS

This application is a U.S. National Stage of International Patent Application No. PCT/CN2022/073128 filed on Jan. 21, 2022, which claims priority to Chinese Patent Application No. 202110156814.4 filed on Feb. 4, 2021, both of which are hereby incorporated by reference in their entireties.

TECHNICAL FIELD

This application relates to the field of electronic devices, and in particular, to a method and an apparatus for performing a control operation, a storage medium, and a control.

BACKGROUND

With popularization of terminal devices in the market, a user has an increasing quantity and types of terminal devices with increasing applications and increasingly rich functions, followed by an increasingly high requirement of the user for intelligence.

For example, in a current picture retrieval application scenario, if a user needs to upload an identity card photo, the user usually needs to manually search for the identity card photo in a large quantity of photos in a gallery, or needs to manually enter a keyword in a search box, to find the identity card photo. In such an application scenario, operations of the user are complex, use efficiency is low, and the user is in desperate need of improvement of end-to-end user experience in intelligence and convenience.

SUMMARY

In view of this, a method and an apparatus for performing a control operation, a storage medium, and a control are proposed.

According to a first aspect, an embodiment of this application provides a method for performing a control operation. The method is applied to a terminal device. The method includes: detecting a trigger operation of a user on a control on a first interface of the terminal device, where the control is used to obtain target data; and in response to the trigger operation of the user, performing a first action and a second action that correspond to the control, where the first action is used to open and display a second interface, and the second action is used to obtain, through matching, information that is on the second interface and that is related to the target data.

According to this embodiment of this application, the trigger operation of the user on the control on the first interface of the terminal device is detected, and the first action and the second action that correspond to the control are performed in response to the trigger operation of the user. The first action is used to open and display the second interface. The second action is used to obtain, through matching, the information that is on the second interface and that is related to the target data. In this way, the user may obtain required information through only a one-click operation, and an application is more intelligent. Therefore, a plurality of operation steps are omitted for the user, and user experience is improved.

According to the first aspect, in a first possible implementation of the method for performing a control operation, the control is used to obtain collected target data. The second interface includes a data browsing interface. The information includes data, related to the target data, in collected data displayed on the data browsing interface. The data related to the target data is highlighted on the data browsing interface.

According to this embodiment of this application, in response to the trigger operation on the control, the data, related to the target data, in the collected data is obtained through matching on the data browsing interface, and the data related to the target data is highlighted. In this way, an operation of highlighting, on the data browsing interface, data that matches the target data may be automatically implemented, and the user does not need to perform an operation such as manual search, so that time is saved for the user, an operation is simplified, and user experience is improved. In addition, this embodiment of this application does not focus on only a problem in a specific step of using the application by the user, and end-to-end user experience in all steps in a plurality of scenarios is improved.

According to the first possible implementation of the first aspect, in a second possible implementation of the method for performing a control operation, the data browsing interface includes a gallery browsing interface. The obtaining, through matching, information that is on the second interface and that is related to the target data includes: obtaining a picture related to the target data from a picture on the gallery browsing interface.

According to this embodiment of this application, the terminal device may automatically obtain, through matching, a picture required by the user from a gallery, so that the application is more intelligent, and the user may directly find the required picture through one operation step. This avoids complex operations of the user, and improves user experience.

According to the first aspect, in a third possible implementation of the method for performing a control operation, the control is used to collect the target data. The second interface includes a data collection interface of a data collection application. The information includes a data collection mode, related to the target data, in a candidate data collection mode on the data collection interface. The data collection application is set to the data, collection mode related to the target data.

According to this embodiment of this application, in response to the trigger operation on the control, the data collection mode related to the target data is obtained through matching on the data collection interface of the data collection application, and the data collection application is set to the data collection mode related to the target data. In this way, the user does not need to perform an operation such as manually switching a mode, so that the application is more intelligent, and more convenience is brought to the user.

According to the third possible implementation of the first aspect, in a fourth possible implementation of the method for performing a control operation, the data collection application includes a camera. The data collection interface includes a photographing interface of the camera. The obtaining, through matching, information that is on the second interface and that is related to the target data includes: obtaining a photographing mode related to the target data from a candidate photographing mode on the photographing interface of the camera, and setting the camera to the photographing mode related to the target data.

According to this embodiment of this application, the terminal device may automatically set the camera to a photographing mode required by the user, so that the application is more intelligent, and the user may obtain the automatically set camera mode through one operation step, to obtain the target data more conveniently. This avoids complex operations of the user, and improves user experience.

According to the first aspect or the first, second, third, or fourth possible implementation of the first aspect, in a fifth possible implementation of the method for performing a control operation, the target data includes one or more of a picture, a video, a sound, and a text.

According to this embodiment of this application, end-to-end user experience may be improved in a plurality of scenarios.

According to the first aspect, in a sixth possible implementation of the method for performing a control operation, the obtaining, through matching, information that is on the second interface and that is related to the target data specifically includes: determining an action attribute of the second action corresponding to the control, where the action attribute includes an execution parameter of the second action, and the execution parameter corresponds to the target data; and obtaining, through matching, the information based on the execution parameter.

According to this embodiment of this application, the action attribute of the second action corresponding to the control is determined, and the information is obtained through matching based on the execution parameter. In this way, effect of implementing a plurality of operation steps by the user through one operation step may be implemented. Therefore, an operation of the user is simplified, and the application is more intelligent.

According to the sixth possible implementation of the first aspect, in a seventh possible implementation of the method for performing a control operation, the action attribute includes an execution parameter that is preset in an operating system of the terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex structured query language (structured query language, SQL) parameter, and does not need to invoke, in the function code, an interface of a retrieval function provided in the operating system. Therefore, the operating system may be prevented from exposing an interface externally, and a risk of the operating system being attacked may be reduced. Presetting in the operating system may reduce the risk of the operating system being attacked due to interface exposure. In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

According to the sixth possible implementation of the first aspect, in an eighth possible implementation of the method for performing a control operation, the action attribute includes an execution parameter that is obtained by the terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

According to a second aspect, an embodiment of this application provides a method for performing a control operation. The method is applied to a terminal device. The method includes: detecting a trigger operation of a user on a control on a first interface of the terminal device, where the control is used to open a second interface; and in response to the trigger operation of the user, performing a first action and a second action that correspond to the control, where the first action is used to open and display the second interface, and the second action is used to set a display status corresponding to the second interface.

According to this embodiment of this application, the trigger operation of the user on the control on the first interface of the terminal device is detected, and the first action and the second action that correspond to the control are performed in response to the trigger operation of the user. The first action is used to open and display the second interface. The second action is used to set the display status corresponding to the second interface. In this way, the user may obtain a required display status of an interface through only a one-click operation without manual setting. Therefore, a plurality of operation steps are omitted for the user, an application is more intelligent, and user experience is improved.

According to the second aspect, in a first possible implementation of the method for performing a control operation, the setting a display status corresponding to the second interface includes: when the second interface is displayed, setting a screen of the terminal device to an eye comfort mode.

According to this embodiment of this application, when the user browses an interface, the terminal device may be automatically switched to the eye comfort mode, and the user does not need to perform manual adjustment when browsing the interface, so that the application is more intelligent, and user experience is improved.

According to the second aspect, in a second possible implementation of the method for performing a control operation, the setting a display status corresponding to the second interface includes: when the second interface is displayed, setting a screen of the terminal device to an always-on mode.

According to this embodiment of this application, when the user views an interface, the terminal device may be automatically switched to the always-on mode, and the user does not need to perform a manual operation to prevent the screen from being turned off, so that the application is more intelligent, and user experience is improved.

According to the second aspect, in a third possible implementation of the method for performing a control operation, the setting a display status corresponding to the second interface specifically includes: determining an action attribute of the second action corresponding to the control, where the action attribute includes an execution parameter of the second action, and the execution parameter corresponds to the display status; and setting the display status based on the execution parameter.

According to this embodiment of this application, the action attribute of the second action corresponding to the control is determined, and the display status is set based on the execution parameter, so that after the user opens an interface, the terminal device may automatically set a display status. In this way, effect of implementing a plurality of operation steps by the user through one operation step may be implemented. Therefore, an operation of the user is simplified, and the application is more intelligent.

According to the third possible implementation of the second aspect, in a fourth possible implementation of the method for performing a control operation, the action attribute includes an execution parameter that is preset in an operating system of the terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex SQL parameter, and does not need to invoke, in the function code, an interface of a retrieval function provided in the operating system. Therefore, the operating system may be prevented from exposing an interface externally, and a risk of the operating system being attacked may be reduced. Presetting in the operating system may reduce the risk of the operating system being attacked due to interface exposure. In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

According to the third possible implementation of the second aspect, in a fifth possible implementation of the method for performing a control operation, the action attribute includes an execution parameter that is obtained by the terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

According to a third aspect, an embodiment of this application provides an apparatus for performing a control operation. The apparatus is used in a terminal device. The apparatus includes: a first detection module, configured to detect a trigger operation of a user on a control on a first interface of the terminal device, where the control is used to obtain target data; and a first execution module, configured to: in response to the trigger operation of the user, perform a first action and a second action that correspond to the control, where the first action is used to open and display a second interface, and the second action is used to obtain, through matching, information that is on the second interface and that is related to the target data.

According to the third aspect, in a first possible implementation of the apparatus for performing a control operation, the control is used to obtain collected target data. The second interface includes a data browsing interface. The information includes data, related to the target data, in collected data displayed on the data browsing interface. The data related to the target data is highlighted on the data browsing interface.

According to the first possible implementation of the third aspect, in a second possible implementation of the apparatus for performing a control operation, the data browsing interface includes a gallery browsing interface. The obtaining, through matching, information that is on the second interface and that is related to the target data includes: obtaining a picture related to the target data from a picture on the gallery browsing interface.

According to the third aspect, in a third possible implementation of the apparatus for performing a control operation, the control is used to collect the target data. The second interface includes a data collection interface of a data collection application. The information includes a data collection mode, related to the target data, in a candidate data collection mode on the data collection interface. The data collection application is set to the data collection mode related to the target data.

According to the third possible implementation of the third aspect, in a fourth possible implementation of the apparatus for performing a control operation, the data collection application includes a, camera. The data collection interface includes a photographing interface of the camera. The obtaining, through matching, information that is on the second interface and that is related to the target data includes: obtaining a photographing mode related to the target data from a candidate photographing mode on the photographing interface of the camera, and setting the camera to the photographing mode related to the target data.

According to the third aspect or the first, second, third, or fourth possible implementation of the third aspect, in a fifth possible implementation of the apparatus for performing a control operation, the target data includes one or more of a picture, a video, a sound, and a text.

According to the third aspect, in a sixth possible implementation of the apparatus for performing a control operation, the obtaining, through matching, information that is on the second interface and that is related to the target data specifically includes: determining an action attribute of the second action corresponding to the control, where the action attribute includes an execution parameter of the second action, and the execution parameter corresponds to the target data; and obtaining, through matching, the information based on the execution parameter.

According to the sixth possible implementation of the third aspect, in a seventh possible implementation of the apparatus for performing a control operation, the action attribute includes an execution parameter that is preset in an operating system of the terminal device and that is associated with the control.

According to the sixth possible implementation of the third aspect, in an eighth possible implementation of the apparatus for performing a control operation, the action attribute includes an execution parameter that is obtained by the terminal device on the first interface and that is associated with the control.

According to a fourth aspect, an embodiment of this application provides an apparatus for performing a control operation. The apparatus is used in a terminal device. The apparatus includes: a second detection module, configured to detect a trigger operation of a user on a control on a first interface of the terminal device, where the control is used to open a second interface; and a second execution module, configured to, in response to the trigger operation of the user, perform a first action and a second action that correspond to the control, where the first action is used to open and display the second interface, and the second action is used to set a display status corresponding to the second interface.

According to the fourth aspect, in a first possible implementation of the apparatus for performing a control operation, the setting a display status corresponding to the second interface includes: when the second interface is displayed, setting a screen of the terminal device to an eye comfort mode.

According to the fourth aspect, in a second possible implementation of the apparatus for performing a control operation, the setting a display status corresponding to the second interface includes: when the second interface is displayed, setting a screen of the terminal device to an always-on mode.

According to the fourth aspect, in a third possible implementation of the apparatus for performing a control operation, the setting a display status corresponding to the second interface specifically includes: determining an action attribute of the second action corresponding to the control, where the action attribute includes an execution parameter of the second action, and the execution parameter corresponds to the display status; and setting the display status based on the execution parameter.

According to the third possible implementation of the fourth aspect, in a fourth possible implementation of the apparatus for performing a control operation, the action attribute includes an execution parameter that is preset in an operating system of the terminal device and that is associated with the control.

According to the third possible implementation of the fourth aspect, in a fifth possible implementation of the apparatus for performing a control operation, the action attribute includes an execution parameter that is obtained by the terminal device on the first interface and that is associated with the control.

According to a fifth aspect, an embodiment of this application provides an apparatus for performing a control operation. The apparatus includes: a processor; and a memory configured to store instructions executable by the processor. The processor is configured to: when executing the instructions, implement the method for performing a control operation according to the first aspect or one or more of a plurality of possible implementations of the first aspect, or implement the method for performing a control operation according to the second aspect or one or more of a plurality of possible implementations of the second aspect.

According to a sixth aspect, an embodiment of this application provides a control. The control corresponds to at least a first action attribute and a second action attribute. The first action attribute is used to determine a first action. The second action attribute is used to determine a second action. The first action is used to enter a first interface. In response to a trigger operation of a user on the control, the first action is performed based on the first action attribute, and the second action is performed based on the second action attribute.

According to the sixth aspect, in a first possible implementation of the control, the control is used to obtain target data. The second action is used to obtain, through matching after the first interface is entered, information that is on the first interface and that is related to the target data.

According to the sixth aspect, in a second possible implementation of the control, the second action is used to set a display status corresponding to the first interface after the first interface is entered.

According to the first possible implementation of the sixth aspect, in a third possible implementation of the control, the second action attribute includes an execution parameter of the second action. The execution parameter corresponds to the target data. The obtaining, through matching, information that is on the first interface and that is related to the target data specifically includes: obtaining, through matching, the information based on the execution parameter.

According to the second possible implementation of the sixth aspect, in a fourth possible implementation of the control, the second action attribute includes an execution parameter of the second action. The execution parameter corresponds to the display status. The setting a display status corresponding to the first interface specifically includes: setting the display status based on the execution parameter.

According to the third or fourth possible implementation of the sixth aspect, in a fifth possible implementation of the control, the second action attribute includes an execution parameter that is preset in an operating system of a terminal device and that is associated with the control.

According to the third or fourth possible implementation of the sixth aspect, in a sixth possible implementation of the control, the second action attribute includes an execution parameter that is obtained by a terminal device on the first interface and that is associated with the control.

According to a seventh aspect, an embodiment of this application provides a non-volatile computer-readable storage medium. The non-volatile computer-readable storage medium stores computer program instructions. When the computer program instructions are executed by a processor, the method for performing a control operation according to the first aspect or one or more of a plurality of possible implementations of the first aspect is implemented, or the method for performing a control operation according to the second aspect or one or more of a plurality of possible implementations of the second aspect is implemented.

According to an eighth aspect, an embodiment of this application provides a terminal device. The terminal device may implement the method for performing a control operation according to the first aspect or one or more of a plurality of possible implementations of the first aspect, or implement the method for performing a control operation according to the second aspect or one or more of a plurality of possible implementations of the second aspect.

According to a ninth aspect, an embodiment of this application provides a computer program product including computer-readable code or a non-volatile computer-readable storage medium carrying computer-readable code. When the computer-readable code runs in an electronic device, a processor in the electronic device implements the method for performing a control operation according to the first aspect or one or more of a plurality of possible implementations of the first aspect, or implements the method for performing a control operation according to the second aspect or one or more of a plurality of possible implementations of the second aspect.

These aspects and other aspects of this application are more concise and more comprehensive in descriptions of the following (a plurality of) embodiments.

BRIEF DESCRIPTION OF DRAWINGS

The accompanying drawings incorporated in this specification as a part of this specification, together with this specification, show example embodiments, features, and aspects of this application, and are intended to explain a principle of this application.

DESCRIPTION OF EMBODIMENTS

The following describes various example embodiments, features, and aspects of this application in detail with reference to the accompanying drawings. A same reference sign in the accompanying drawings denotes elements with a same or similar function. Although various aspects of embodiments are shown in the accompanying drawings, the accompanying drawings are not necessarily drawn in proportion unless otherwise specified.

The specific term "example" herein means "used as an example, embodiment, or illustration". Any embodiment described herein as an "example" is not necessarily explained as being superior to or better than other embodiments.

In addition, numerous specific details are given in the following specific implementations, to better describe this application. A person skilled in the art should understand that this application can also be implemented without some specific details. In some embodiments, methods, means, elements, and circuits that are well-known to a person skilled in the art are not described in detail, so that a subject matter of this application is highlighted.

Figure 1A:
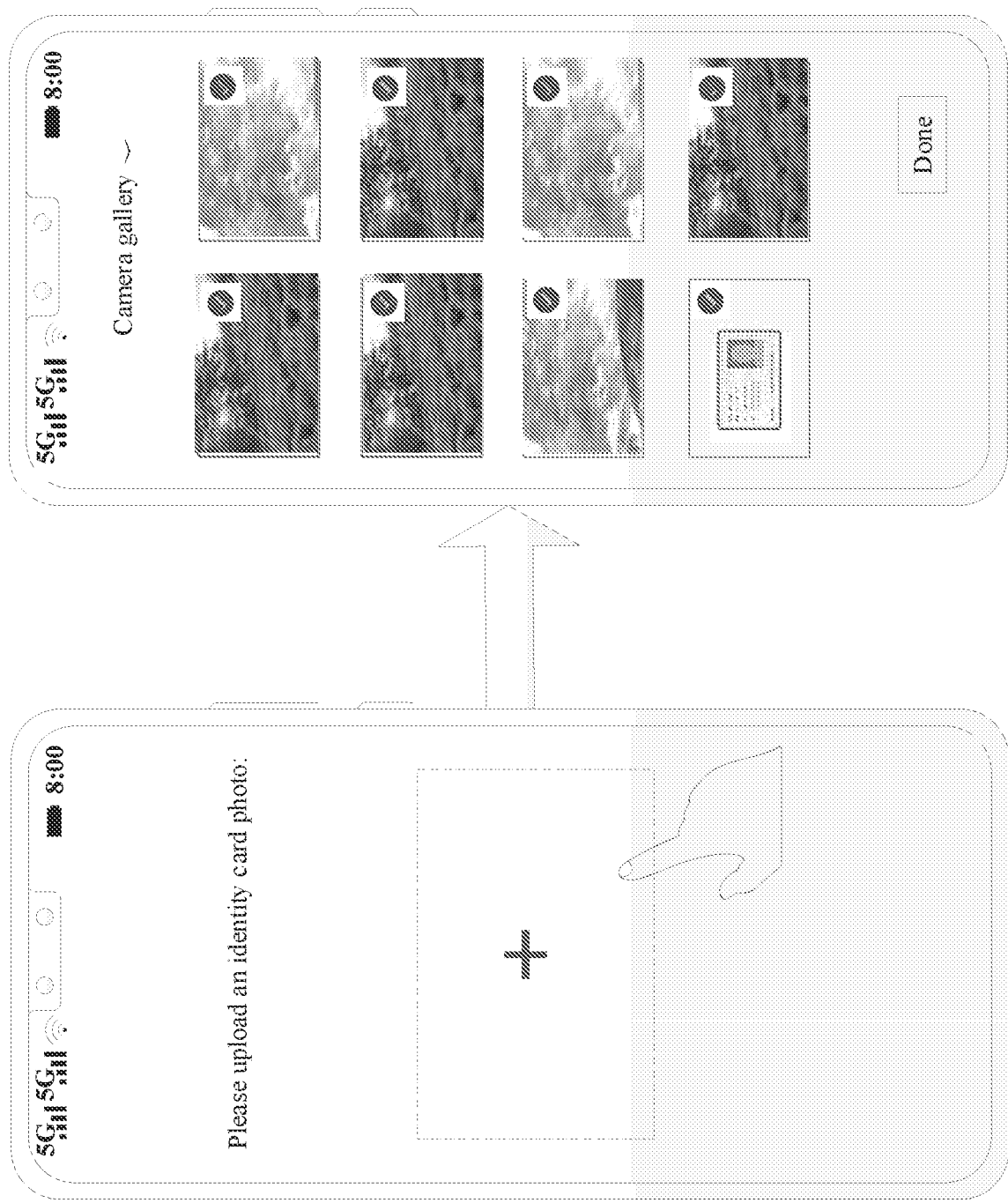
FIG. 1a is a schematic diagram of an application scenario according to the conventional technology.

Currently, in many scenarios, a user needs to perform many operations to implement obtaining, query, setting, or the like of information. This is not so intelligent, and brings poor user experience. For example, when handling an individual business, the user needs to upload an identity card photo. As shown in FIG. 1a, after entering a personal information interface, the user may obtain the identity card photo by tapping a button for uploading an identity card photo. After the user taps the button for uploading an identity card photo, a terminal device enters a gallery. Photos in the gallery are sorted in descending order of time when the user took the photos. The user needs to manually find the identity card photo from massive photos and upload the photo. In this application scenario, if the user took the identity card photo a long time ago, it may take a large amount of time for the user to manually search for the identity card photo.

Figure 1B:
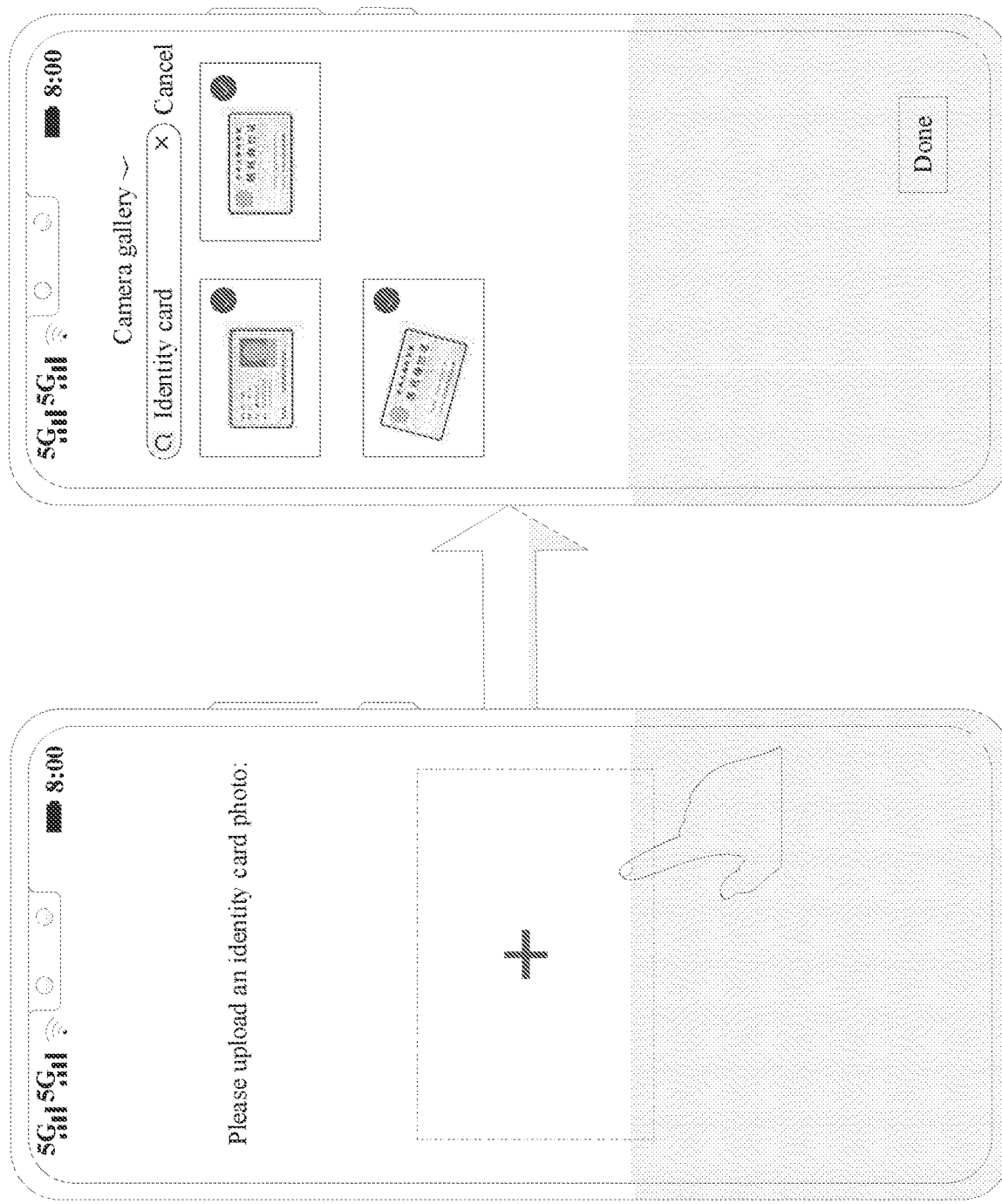
FIG. 1b is a schematic diagram of an application scenario according to the conventional technology.

Alternatively, in an application scenario shown in FIG. 1b, after the user taps a button for uploading an identity card photo, a gallery is entered. The user may attempt to manually enter a keyword "Identity card" in a search box in an upper part of a gallery display interface for search, and select and upload a found identity card photo. In the application scenario shown in FIG. 1b, time for manual search by the user is saved, but the user still needs to perform several operation steps.

An embodiment of this application provides a method for performing a control operation. The method for performing a control operation in this embodiment of this application may be applied to the terminal device. A plurality of specific operations are automatically implemented in response to an operation of the user on a control, so that an application is more intelligent, a plurality of operation steps are omitted for the user, and user experience is improved.

The terminal device may be a device with a wireless connection function. The wireless connection function means that the terminal device may be connected to another terminal device in a wireless connection manner such as Wi-Fi or Bluetooth. The terminal device in this application may also have a function of performing communication by using a wired connection. The terminal device in this application may be a touchscreen device, a non-touchscreen device, or a screen-less device. The touchscreen device may be controlled by tapping or sliding on a display screen by using a finger, a stylus, or the like. The non-touchscreen device may be connected to an input device, for example, a mouse, a keyboard, or a touch panel, and is controlled by using the input device. The screen-less device may be, for example, a screen-less Bluetooth speaker. For example, the terminal device in this application may be a smartphone, a netbook, a tablet computer, a notebook computer, a wearable electronic device (for example, a smart band or a smartwatch), a TV, a virtual reality device, a sound box, or electronic ink. A type of the terminal device is not limited in this application, and an operating system carried by the terminal device is not limited either. This embodiment of this application may be applied to any operating system. This embodiment of this application may also be applied to a scenario other than this.

Figure 2:
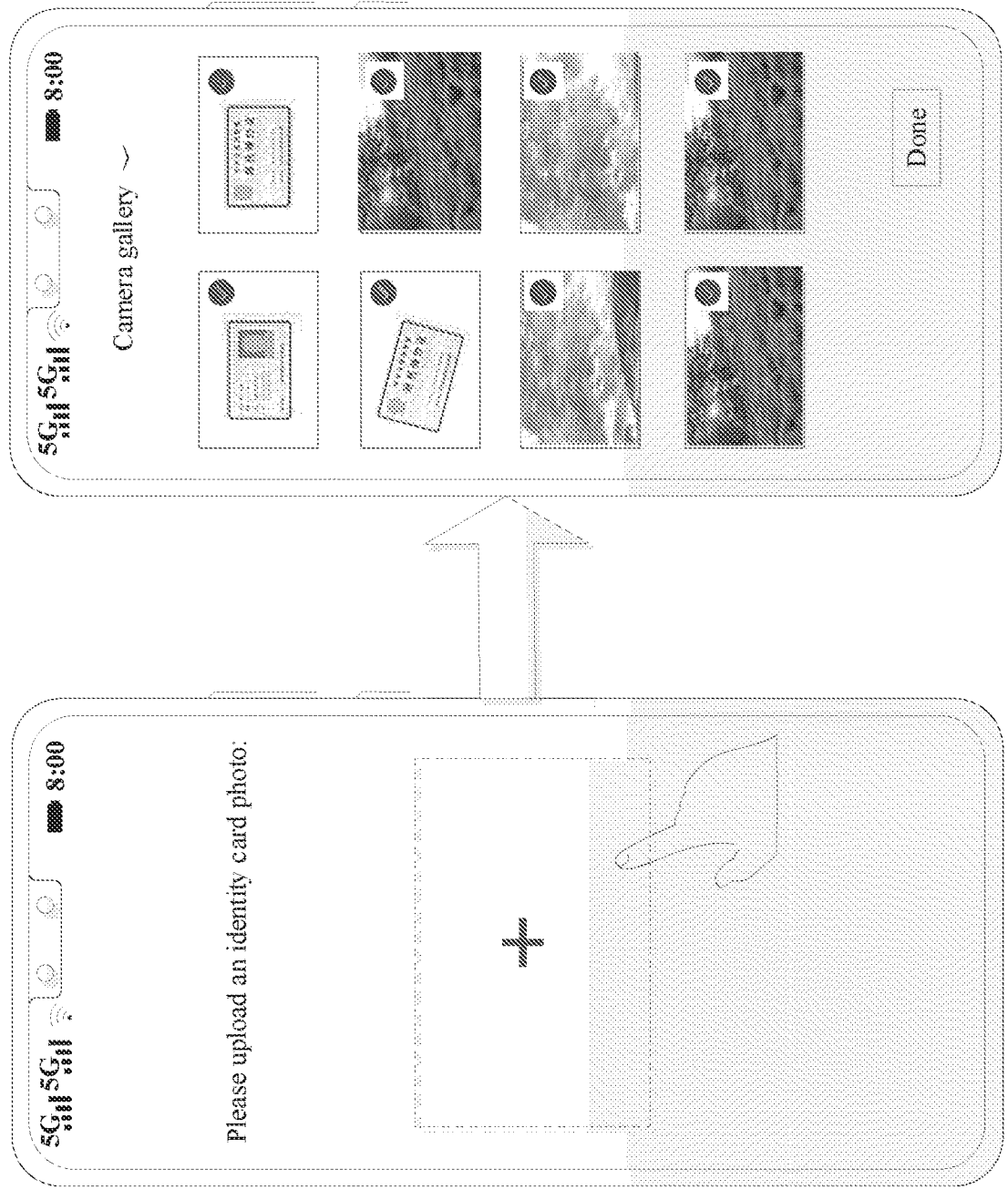
FIG. 2 is a schematic diagram of an application scenario according to an embodiment of this application.

FIG. 2 is a schematic diagram of an application scenario according to an embodiment of this application. The following uses a scenario in which the user uploads the identity card photo in the application as an example for description. A person skilled in the art should understand that this embodiment of this application is not limited to such an application scenario.

As shown in FIG. 2, after the user opens an interface, the interface prompts the user to upload the identity card photo. The user may tap a dashed box shown in FIG. 2(a) to enter the gallery, and select the corresponding photo in the gallery to upload. According to the method provided in this embodiment of this application, after the gallery is entered, the system automatically obtains a matched identity card photo, and arranges the matched photo in a front part of the gallery. The user may directly select a required identity card photo. The user does not need to manually find the required photo from massive photos in the gallery, and does not need to find a retrieval entry and enter a retrieval condition. It should be noted that a retrieval result obtained by the system may be presented to the user in a plurality of manners. This is not limited in this embodiment of this application. In a possible implementation, the system may further directly pop up a dialog box including the retrieval result of the identity card photo for the user to select. According to the method for performing a control operation provided in this embodiment of this application, intelligence of the application may be improved, so that an information search step is omitted in an operation process of the user in the application scenario, convenience and intelligence in use are improved, and user experience is better.

In an example application scenario, after the user opens the interface, the interface displays a request for uploading the identity card photo, and includes a control for browsing a photo. After the user taps the control on the interface, the gallery may be opened. In this case, the terminal device may automatically display the identity card photo in front of all photos. In a possible implementation, the terminal device may alternatively display only the identity card photo in the gallery. In this case, the user may directly perform selection instead of performing manual retrieval. For a schematic diagram of the application scenario, refer to FIG. 2.

Figure 3:
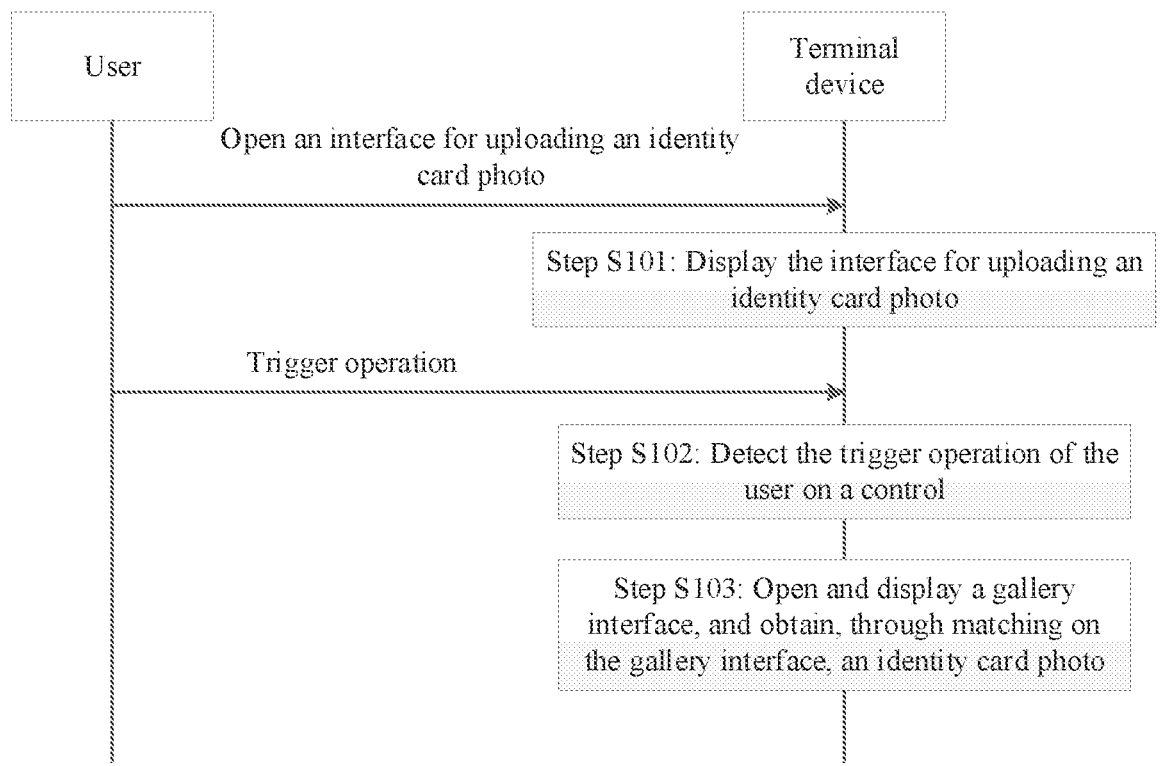
FIG. 3 is a flowchart of a method for performing a control operation according to an embodiment of this application.

Based on this application scenario. FIG. 3 is a flowchart of a method for performing an operation according to an embodiment of this application. As shown in FIG. 3, a process of the method for performing an operation according to an embodiment of this application includes the following steps.

Step S101: In response to an operation of the user for opening an interface for uploading an identity card photo in the application, display the interface for uploading an identity card photo, where the interface includes a control for obtaining a photo.

A first interface may display content shown in FIG. 2(a). The control may be a button control for opening the gallery, for example, a button in a dashed box in FIG. 2(a). The identity card photo uploaded by the user may be displayed in the dashed box in FIG. 2(a).

The gallery may include a gallery locally used by the terminal device to store a photo, and may further include a gallery used to obtain a photo online.

Step S102: Detect a trigger operation of the user on the control for browsing a photo.

The trigger operation may be a trigger operation of the user on the control, for example, an operation of tapping the button control for browsing a photo on the interface for uploading an identity card photo shown in FIG. 2(a).

Step S103: Open and display a gallery interface in response to the trigger operation of the user on the control, and obtain, through matching on the gallery interface, the identity card photo, to push the identity card photo to the user for the user to directly select.

After the user taps the button control, the terminal device may open the gallery. The identity card photo may be obtained through matching in a manner that the terminal device retrieves the identity card photo from photos in the gallery, and displays the identity card photo in front of all the photos, or displays only the found identity card photo on the gallery interface. In this way, the user may directly select the required identity card photo, and does not need to perform a series of complex operations, for example, opening the gallery, performing manual search, or entering a keyword.

The control in this embodiment of this application may include at least two action attributes. A first action, for example, opening the gallery, may be performed based on a first action attribute that originally exists in the control. A second action, for example, retrieving the identity card photo in the gallery, may further be performed based on a second action attribute that is added to the control. The foregoing action of retrieving the identity card photo in the gallery may be triggered by the second action attribute that is added to the control. The new action attribute may include an execution instruction. The execution instruction may indicate a to-be-performed action, for example, retrieving the identity card photo in the gallery, that is added based on an original action (for example, opening the gallery). The action attribute may further include an execution parameter of the action, for example, content (for example, "identity card") of a retrieved picture. The execution parameter may be preset or default (for example, "null"). In a possible implementation, after the user opens the first interface, the terminal device extracts a keyword included on the first interface, and obtains the execution parameter based on keyword information.

The new action attribute may be added by the terminal device to the operating system, and the operating system performs the corresponding action. The action attribute may be encapsulated with a function for performing the related action by the operating system. For example, for the action attribute for retrieving the picture in the gallery, the encapsulated function may include a function for retrieving a picture in a gallery, or may include a function for re-sorting found pictures.

Figure 4:
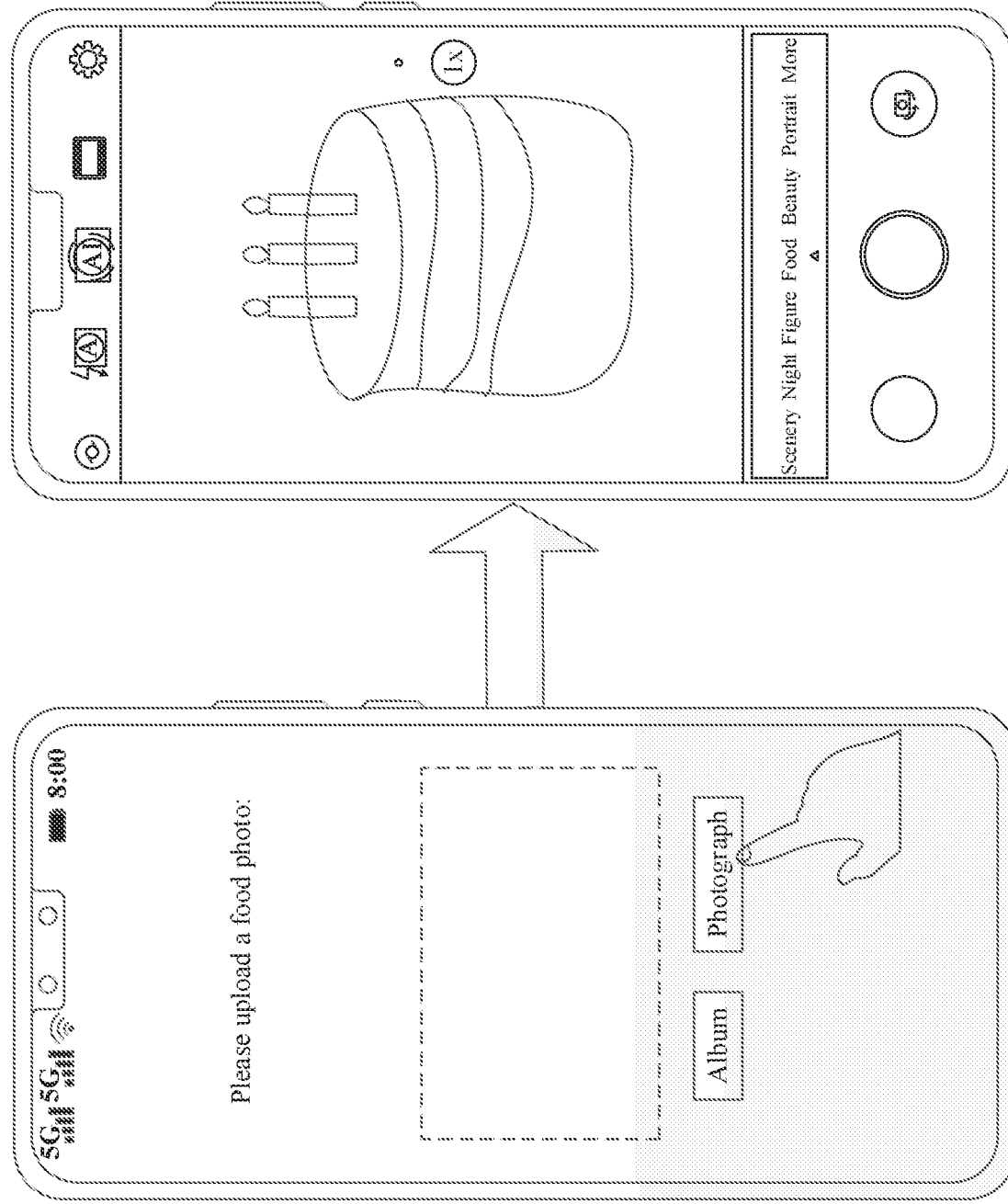
FIG. 4 is a schematic diagram of an application scenario according to an embodiment of this application.

FIG. 4 is a schematic diagram of an application scenario according to another embodiment of this application. As shown in FIG. 4, after opening an interface for uploading a food photo, the user may tap a photographing control on the interface, and turn on a camera. In this case, the terminal device may automatically switch a photographing mode to a food mode (as shown in a lower part of the camera in (b) in FIG. 4). The user may directly see a camera interface on which the photographing mode is set to the food mode. The user does not need to manually set the photographing mode after turning on the camera.

Figure 5:
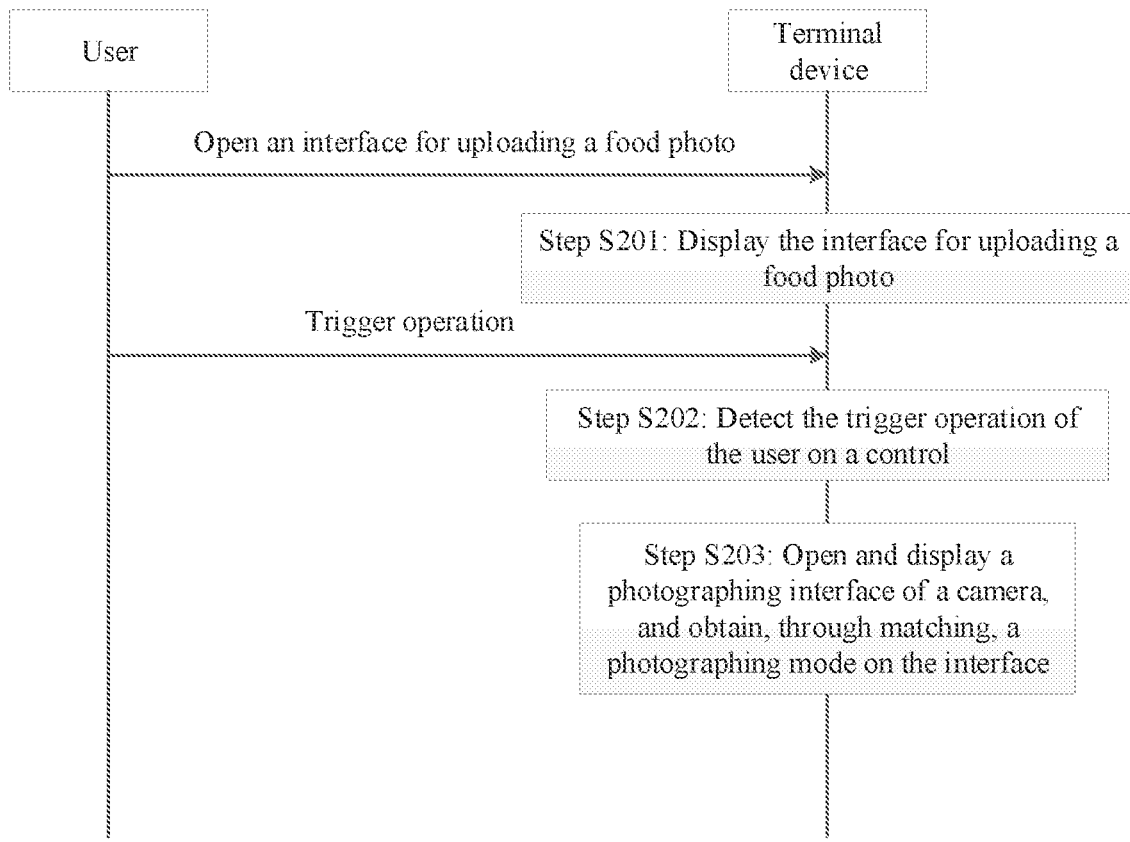
FIG. 5 is a flowchart of a method for performing a control operation according to an embodiment of this application.

In this application scenario. FIG. 5 is a flowchart of the method for performing a control operation according to an embodiment of this application. As shown in FIG. 5, a process of the method for performing a control operation according to an embodiment of this application includes the following steps.

Step S201: Display the interface for uploading a food photo, where the interface includes a control for turning on the camera.

For example, for the control for turning on the camera, refer to a "Photograph" button in (a) in FIG. 4. A food photo uploaded by the user may be displayed in a dashed box in (a) in FIG. 4.

Step S202: Detect a trigger operation of the user on a photographing control.

The trigger operation may be, for example, an operation of tapping the "Photograph" button control on the interface for uploading a food photo shown in (a) in FIG. 4.

Step S203: In response to the trigger operation of the user, open a photographing interface of the camera, and obtain, through matching, the "food" mode on the photographing interface.

The photographing mode of the camera may be set to the "food" mode and displayed (for example, a triangle icon (refer to (b) in FIG. 4) may be used to indicate that the "Food" mode is selected).

After the user taps the button control, the terminal device may turn on the camera to enter the photographing interface.

The operating system may perform an original function of the control, that is, turn on the camera, and may further set the mode of the camera to the food mode based on this (if the photographing mode of the terminal device is not the food mode, the photographing mode of the camera is switched to the food mode). In this way, after the user taps the photographing button control on the interface for uploading a food photo, the food mode of the camera may be automatically entered, and the user does not need to manually switch the photographing mode of the camera.

The control in this embodiment of this application may include at least two action attributes. A first action, for example, turning on the camera, may be performed based on a first action attribute that originally exists in the control. A second action, for example, setting the photographing mode of the camera, may further be performed based on a second action attribute that is added to the control. The action of setting the photographing mode may be triggered by the second action attribute that is added to the control. For example, an execution instruction included in the new action attribute may be setting the photographing mode of the camera. An execution parameter of the action included in the action attribute may indicate a photographing mode that needs to be set for the camera, and may be food, portrait, scenery, or another photographing mode, for example, the food mode herein.

The new action attribute may be added by the terminal device to the operating system, and the operating system performs the corresponding action. The action attribute may be encapsulated with a function for setting a photographing mode of a camera as the execution instruction of the action attribute.

In another application scenario according to an embodiment of this application, before opening the application, the user needs to tap a control (for jumping to a user agreement) to browse a user agreement. Because content of the user agreement is a long text, the terminal device may automatically set a screen display status of an interface for browsing a user agreement to an eye comfort mode. After tapping the control, the user may directly browse the user agreement in the eye comfort mode. The user does not need to manually set the screen display status after opening the interface for browsing a user agreement.

The control in this embodiment of this application may include at least two action attributes. A first action, for example, opening the interface for browsing a user agreement, may be performed based on a first action attribute that originally exists in the control. A second action, for example, setting the screen display status, may further be performed based on a second action attribute that is added to the control. The action of setting the screen display status may be triggered by the second action attribute that is added to the control (for example, a link control herein). For example, an execution instruction included in the new action attribute may be setting the screen display status corresponding to the interface. An execution parameter of the action included in the action attribute may indicate a screen display status that needs to be set, for example, the eye comfort mode herein.

The new action attribute may be added by the terminal device to the operating system, and the operating system performs the corresponding action. The action attribute may be encapsulated with a function for setting a screen display status as the execution instruction of the action attribute.

In another application scenario according to an embodiment of this application, an interface of the application is used to display a static picture (picture) for a long time or play a video. The user may open the interface after tapping a control (for example, a button control) for opening the interface for displaying a static picture. After the interface is opened, the terminal device may automatically set a screen display status of the interface to an always-on mode, so that the user can watch a static picture for a long time without frequently performing a manual operation (for example, tapping a screen) for preventing the screen from being automatically turned off.

The control in this embodiment of this application may include at least two action attributes. A first action, for example, opening the interface for displaying a static picture, may be performed based on a first action attribute that originally exists in the control. A second action, for example, setting the screen display status, may further be performed based on a second action attribute that is added to the control. The action of setting the screen display status may be triggered by the new action attribute in the control (for example, the control for opening the interface for displaying a static picture herein). For example, an execution instruction included in the new action attribute may be setting the screen display status corresponding to the interface. An execution parameter of the action included in the action attribute is, for example, the always-on mode herein.

Figure 6:
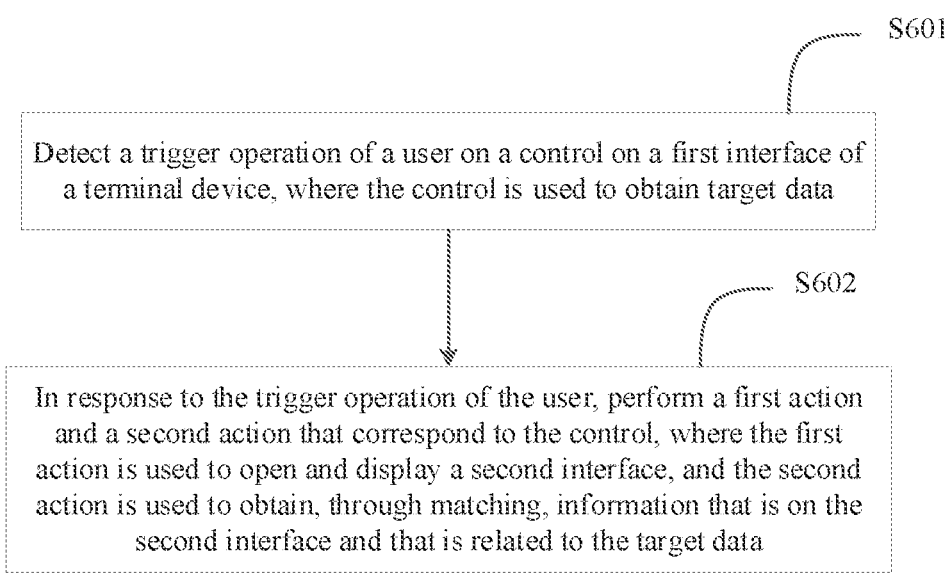
FIG. 6 is a flowchart of a method for performing a control operation according to an embodiment of this application.

FIG. 6 is a flowchart of a method for performing a control operation according to an embodiment of this application. The method is applied to a terminal device. As shown in FIG. 6, the method may include the following steps.

Step S601: Detect a trigger operation of a user on a control on a first interface of the terminal device, where the control is used to obtain target data.

Step S602: In response to the trigger operation of the user, perform a first action and a second action that correspond to the control, where the first action is used to open and display a second interface, and the second action is used to obtain, through matching, information that is on the second interface and that is related to the target data.

According to this embodiment of this application, the trigger operation of the user on the control on the first interface of the terminal device is detected, and the first action and the second action that correspond to the control are performed in response to the trigger operation of the user. The first action is used to open and display the second interface. The second action is used to obtain, through matching, the information that is on the second interface and that is related to the target data. In this way, the user may obtain required information through only a one-click operation, and an application is more intelligent. Therefore, a plurality of operation steps are omitted for the user, and user experience is improved.

The control may be a button control, an interface control, a link control, or the like. This is not limited in this embodiment of this application. The trigger operation may include an operation that the user taps the control or touches and holds the control, or the like.

The first action may be considered as an action that is originally to be performed by the control, for example, an action of opening a gallery or an action of turning on a camera. The second action may be considered as an action of the control that is added based on the first action.

The target data may be data required by the user. The target data may include collected data, for example, data that has been stored in the terminal device, or data that has been stored in a server and that may be accessed through a network. The target data may further include to-be-collected data. In a possible implementation, the target data may include one or more types of data, for example, a picture, a video, a sound, and a text. A type of the target data is not limited in this embodiment of this application.

The second interface may include various information. The information that is obtained through matching, that is on the second interface, and that is related to the target data may be the target data, information that is highly similar to the target data, information that is applicable to collection of the target data, or the like.

In a possible implementation, the control is used to obtain collected target data. The second interface includes a data browsing interface. The information includes data, related to the target data, in collected data displayed on the data browsing interface. The data related to the target data is highlighted on the data browsing interface.

According to this embodiment of this application, in response to the trigger operation on the control, the data, related to the target data, in the collected data is obtained through matching on the data browsing interface, and the data related to the target data is highlighted. In this way, an operation of highlighting, on the data browsing interface, data that matches the target data may be automatically implemented, and the user does not need to perform an operation such as manual search, so that time is saved for the user, an operation is simplified, and user experience is improved. In addition, this embodiment of this application does not focus on only a problem in a specific step of using the application by the user, and end-to-end user experience in all steps in a plurality of scenarios is improved.

A highlighting manner may include any manner that is different from a display manner for other information and that easily attracts attention of the user, for example, displaying the information at the forefront of all information, highlighting the information, or marking the information.

In a possible implementation, the data browsing interface includes a gallery browsing interface. The obtaining, through matching, information that is on the second interface and that is related to the target data includes: obtaining a picture related to the target data from a picture on the gallery browsing interface.

According to this embodiment, the terminal device may automatically obtain, through matching, a picture required by the user from the gallery, so that the application is more intelligent, and the user may directly find the required picture through one operation step. This avoids complex operations of the user, and improves user experience.

For example, refer to the example shown in FIG. 2 and FIG. 3. In response to the trigger operation of the user on the photo browsing control on the interface (the first interface) for uploading an identity card photo, the first action and the second action that correspond to the control are performed. The first action is used to open the gallery interface (the second interface) and determine a candidate photo in the gallery. The second action is used to determine an identity card photo (a picture related to the target data), matching the target data (the identity card photo), in the candidate photo, and display, on the second interface, the identity card photo at the forefront. In a possible implementation, the control is used to collect the target data. The second interface includes a data collection interface of a data collection application. The information includes a data collection mode, related to the target data, in a candidate data collection mode on the data collection interface. The data collection application is set to the data collection mode related to the target data.

According to this embodiment of this application, in response to the trigger operation on the control, the data collection mode related to the target data is obtained through matching on the data collection interface of the data collection application, and the data collection application is set to the data collection mode related to the target data. In this way, the user does not need to perform an operation such as manually switching a mode, so that the application is more intelligent, and more convenience is brought to the user.

A collection method may include shooting, recording, and the like.

In a possible implementation, the data collection application includes a camera. The data collection interface includes a photographing interface of the camera. The obtaining, through matching, information that is on the second interface and that is related to the target data includes: obtaining a photographing mode related to the target data from a candidate photographing mode on the photographing interface of the camera, and setting the camera to the photographing mode related to the target data.

According to this embodiment of this application, the terminal device may automatically set the camera to a photographing mode required by the user, so that the application is more intelligent, and the user may obtain the automatically set camera mode through one operation step, to obtain the target data more conveniently. This avoids complex operations of the user, and improves user experience.

For example, refer to the examples shown in FIG. 4 and FIG. 5. In response to the trigger operation of the user on the control for turning on the camera on the interface (the first interface) for uploading a food photo, the first action and the second action that correspond to the control are performed. The first action is used to open the photographing interface (the second interface) of the camera and determine the candidate photographing mode in the library. The second action is used to determine the "food mode" (a photographing mode related to the target data), matching the target data (the food photo), in the candidate photographing mode, and set, on the second interface, the camera to the food mode.

Figure 7:
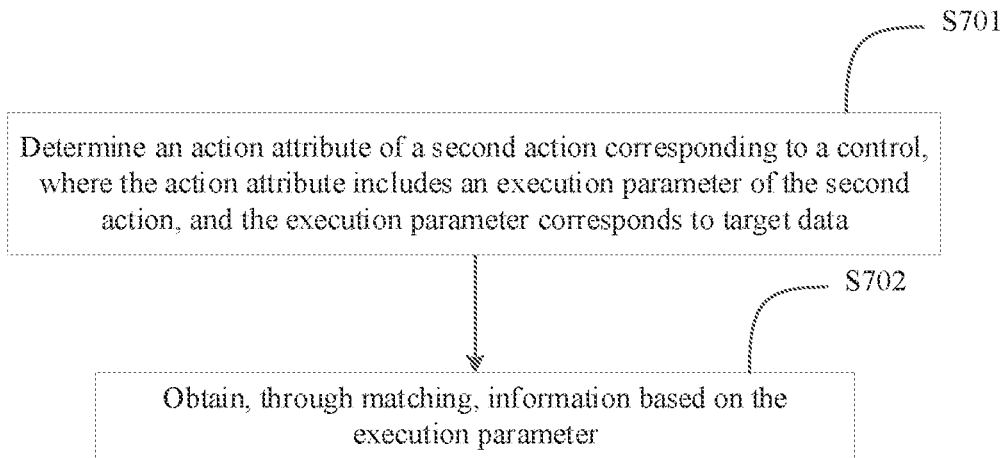
FIG. 7 is a flowchart of a method for performing a control operation according to an embodiment of this application.

FIG. 7 is a flowchart of a method for performing a control operation according to an embodiment of this application. As shown in FIG. 7, the obtaining, through matching, information that is on the second interface and that is related to the target data specifically includes the following steps.

Step S701: Determine an action attribute of the second action corresponding to the control, where the action attribute includes an execution parameter of the second action, and the execution parameter corresponds to the target data.

Step S702: Obtain, through matching, the information based on the execution parameter.

According to this embodiment of this application, the action attribute of the second action corresponding to the control is determined, and the information is obtained through matching based on the execution parameter. In this way, effect of implementing a plurality of operation steps by the user through one operation step may be implemented. Therefore, an operation of the user is simplified, and the application is more intelligent.

The action attribute of the second action may represent the to-be-performed second action. The action attribute of the second action may be encapsulated with a function for performing the corresponding action. The execution parameter may correspond to the target data, for example, may represent feature information of the target data, thereby obtaining, through matching, the information related to the target data. For example, when the target data is an identity card photo, the execution parameter may represent content of the photo, for example, "identity card".

For example, when the second action indicates retrieval of a picture in the gallery, the action attribute of the second action may be encapsulated with a function for retrieving a picture in a gallery, or may include a function for re-sorting found pictures. The execution parameter of the action may include a keyword for retrieving the picture. When the second action indicates setting of the photographing mode of the camera, the action attribute of the second action may be encapsulated with a function for setting a photographing mode of a camera, and the execution parameter of the action may include a to-be-set photographing mode.

For example, when obtaining the action attribute of the second action bound to the control, the terminal device may retrieve a photo in the gallery by using the encapsulated function and based on the execution parameter (for example, "identity card" herein) of the action attribute, to find an identity card photo.

In a possible implementation, the action attribute includes an execution parameter that is preset in an operating system of the terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex structured query language (structured query language, SQL) parameter, and does not need to invoke, in the function code, an interface of a retrieval function provided in the operating system. Therefore, the operating system may be prevented from exposing an interface externally and a risk of the operating system being attacked may be reduced. Presetting in the operating system may reduce the risk of the operating system being attacked due to interface exposure. In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

The action attribute of the second action may be added to the operating system. After addition, the new action attribute may be bound to the control, and the execution parameter of the action attribute is set in the action attribute.

For example, an action attribute for retrieving a photo in the gallery may be added to the operating system in advance, the new action attribute is bound to a button control for browsing a photo on an interface for uploading an identity card photo, and an execution parameter is set to "identity card". Therefore, after the user triggers the button control, the operating system may obtain the new action attribute, and when performing an original action (the first action, for example, opening the gallery) of the button control, may further perform the second action (for example, retrieving the identity card photo in the gallery) corresponding to the new action attribute.

In a possible implementation, the action attribute includes an execution parameter that is obtained by the terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

For example, when the second action indicates retrieval of a picture in the gallery, the execution parameter of the second action may first be a default value. When the interface for uploading an identity card photo is opened, the interface is scanned, a target keyword (for example, "identity card") in text content included on the interface is recognized, and "identity card" is used as the execution parameter of the second action.

When it is recognized that the interface includes the target keyword (for example, "identity card"), the target keyword may be extracted. The target keyword is transferred to a next step by the terminal device (for example, inside the operating system) (for example, content of the target keyword is stored in a shared memory of the operating system, so that in the next step, the content of the target keyword may be extracted from the shared memory as the execution parameter of the second action).

The action attribute for scanning and recognizing the target keyword on the first interface may be bound to the first interface. In response to an operation of the user for opening the first interface, the terminal device may obtain the action attribute corresponding to the first interface.

For example, an action attribute for scanning the interface for uploading an identity card photo and extracting the target keyword may be added to the operating system in advance. The new action attribute is bound to the interface for uploading an identity card photo. An execution parameter of the action attribute is set to the target keyword (for example, identity card) to be extracted from the interface.

Figure 8:
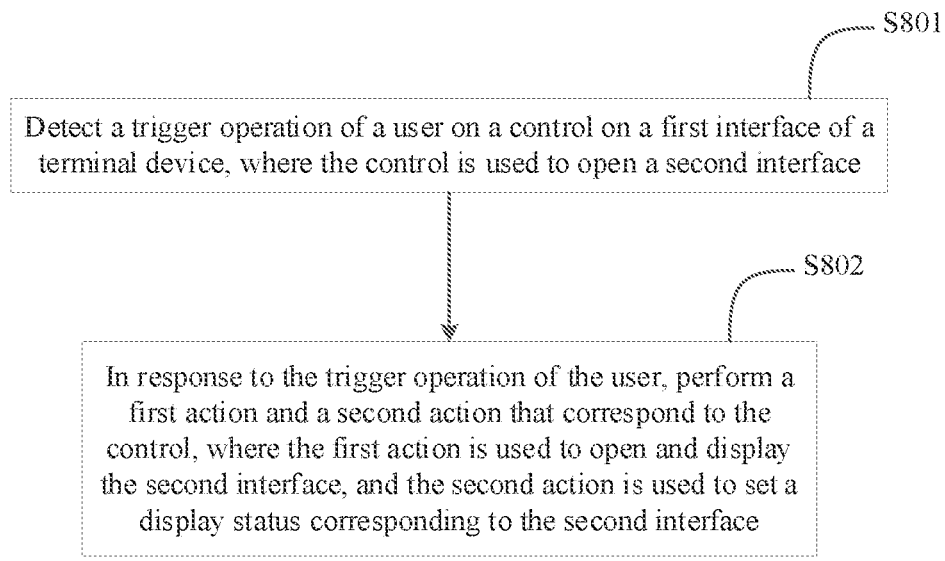
FIG. 8 is a flowchart of a method for performing a control operation according to an embodiment of this application.

FIG. 8 is a flowchart of a method for peforming a control operation according to an embodiment of this application. The method is applied to a terminal device. As shown in FIG. 8, the method includes the following steps.

Step S801: Detect a trigger operation of a user on a control on a first interface of the terminal device, where the control is used to open a second interface.

Step S802: In response to the trigger operation of the user, perform a first action and a second action that correspond to the control, where the first action is used to open and display the second interface, and the second action is used to set a display status corresponding to the second interface.

According to this embodiment of this application, the trigger operation of the user on the control on the first interface of the terminal device is detected, and the first action and the second action that correspond to the control are performed in response to the trigger operation of the user. The first action is used to open and display the second interface. The second action is used to set the display status corresponding to the second interface. In this way, the user may obtain a required display status of an interface through only a one-click operation without manual setting. Therefore, a plurality of operation steps are omitted for the user, an application is more intelligent, and user experience is improved.

The first action may be considered as an action that is originally to be performed by the control, for example, an action of opening an interface corresponding to a link control. The second action may be considered as a new action of the control. The display status of the interface may include a display status that meets a display requirement of the second interface.

In a possible implementation, the setting a display status corresponding to the second interface includes: when the second interface is displayed, setting a screen of the terminal device to an eye comfort mode.

According to this embodiment of this application, when the user browses an interface, the terminal device may be automatically switched to the eye comfort mode, and the user does not need to perform manual adjustment when browsing the interface, so that the application is more intelligent, and user experience is improved.

The eye comfort mode may be set when a document that needs to be read for a long time is displayed on the second interface. The document that needs to be read for a long time includes, for example, a long user agreement and novel. For example, in response to a trigger operation of the user on a link control that is on the first interface and that is used to open a user agreement, a first action and a second action that correspond to the control are performed. The first action is used to open an interface (the second interface) for browsing a user agreement and display the user agreement. The second action is used to set the screen to the eye comfort mode.

In a possible implementation, the setting a display status corresponding to the second interface includes: when the second interface is displayed, setting a screen of the terminal device to an always-on mode.

The always-on mode may be set when a static or dynamic picture that needs to be watched for a long time or a video is displayed on the second interface. For example, in response to a trigger operation of the user on a button control that is on the first interface and that is used to display a static picture, a first action and a second action that correspond to the control are performed. The first action is used to open an interface (the second interface) displaying a static picture and display the static picture. The second action is used to set the screen to the always-on mode.

According to this embodiment of this application, when the user views an interface, the terminal device may be automatically switched to the always-on mode, and the user does not need to perform a manual operation to prevent the screen from being turned off, so that the application is more intelligent, and user experience is improved.

Figure 9:
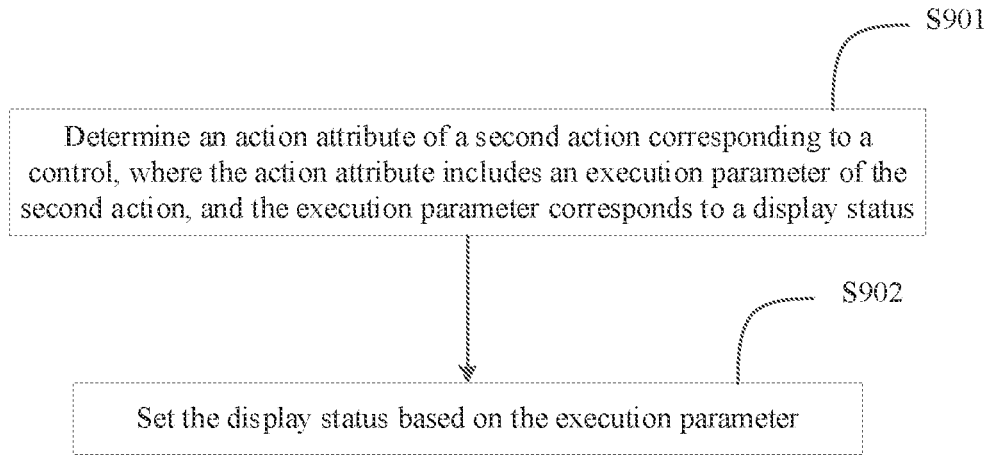
FIG. 9 is a flowchart of a method for performing a control operation according to an embodiment of this application.

FIG. 9 is a flowchart of a method for performing a control operation according to an embodiment of this application. As shown in FIG. 9, the setting a display status corresponding to the second interface specifically includes the following steps.

Step S901: Determine an action attribute of the second action corresponding to the control, where the action attribute includes an execution parameter of the second action, and the execution parameter corresponds to the display status.

Step S902: Set the display status based on the execution parameter.

According to this embodiment of this application, the action attribute of the second action corresponding to the control is determined, and the display status is set based on the execution parameter, so that after the user opens an interface, the terminal device may automatically set a display status. In this way, effect of implementing a plurality of operation steps by the user through one operation step may be implemented. Therefore, an operation of the user is simplified, and the application is more intelligent.

For example, the second action may be setting a screen display status. The action attribute of the second action may be encapsulated with a function for setting a screen display status. The execution parameter of the second action may be a specific set screen display state, for example, the always-on mode or the eye comfort mode. The execution parameter of the second action may further include screen-on duration of the screen after the always-on mode is entered.

In a possible implementation, the action attribute includes an execution parameter that is preset in an operating system of the terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex SQL parameter, and does not need to invoke, in the function code, an interface of a retrieval function provided in the operating system. Therefore, the operating system may be prevented from exposing an interface externally, and a risk of the operating system being attacked may be reduced. Presetting in the operating system may reduce the risk of the operating system being attacked due to interface exposure. In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

In a possible implementation, the method further includes: The action attribute includes an execution parameter that is obtained by the terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

For example, when the first interface is opened, a target keyword "user agreement" included on the first interface may be scanned and recognized. An execution parameter of an action attribute of a control for opening a user agreement is set to the "eye comfort mode" based on a correspondence between the "user agreement" and the execution parameter "eye comfort mode".

Figure 10:
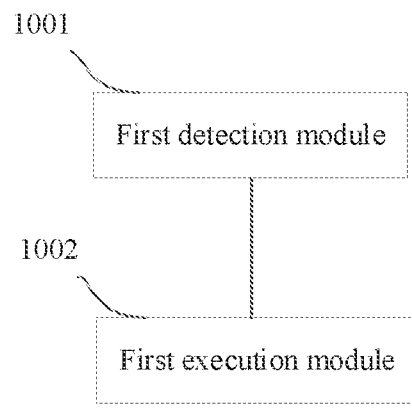
FIG. 10 is a diagram of a structure of an apparatus for performing a control operation according to an embodiment of this application.

FIG. 10 is a diagram of a structure of an apparatus for performing a control operation according to an embodiment of this application. The apparatus is used in a terminal device. As shown in FIG. 10, the apparatus includes:

- a first detection module 1001, configured to detect a trigger operation of a user on a control on a first interface of the terminal device, where the control is used to obtain target data and
- a first execution module 1002, configured to: in response to the trigger operation of the user, perform a first action and a second action that correspond to the control, where the first action is used to open and display a second interface, and the second action is used to obtain, through matching, information that is on the second interface and that is related to the target data.

According to this embodiment of this application, the trigger operation of the user on the control on the first interface of the terminal device is detected, and the first action and the second action that correspond to the control are performed in response to the trigger operation of the user. The first action is used to open and display the second interface. The second action is used to obtain, through matching, the information that is on the second interface and that is related to the target data. In this way, the user may obtain required information through only a one-click operation, and an application is more intelligent. Therefore, a plurality of operation steps are omitted for the user, and user experience is improved.

In a possible implementation, the control is used to obtain collected target data. The second interface includes a data browsing interface. The information includes data, related to the target data, in collected data displayed on the data browsing interface. The data related to the target data is highlighted on the data browsing interface.

According to this embodiment of this application, in response to the trigger operation on the control, the data, related to the target data, in the collected data is obtained through matching on the data browsing interface, and the data related to the target data is highlighted. In this way, an operation of highlighting, on the data browsing interface, data that matches the target data may be automatically implemented, and the user does not need to perform an operation such as manual search, so that time is saved for the user, an operation is simplified, and user experience is improved. In addition, this embodiment of this application does not focus on only a problem in a specific step of using the application by the user, and end-to-end user experience in all steps in a plurality of scenarios is improved.

In a possible implementation, the data browsing interface includes a gallery browsing interface. The obtaining, through matching, information that is on the second interface and that is related to the target data includes: obtaining a picture related to the target data from a picture on the gallery browsing interface.

According to this embodiment of this application, the terminal device may automatically obtain, through matching, a picture required by the user from a gallery, so that the application is more intelligent, and the user may directly find the required picture through one operation step. This avoids complex operations of the user, and improves user experience.

In a possible implementation, the control is used to collect the target data. The second interface includes a data collection interface of a data collection application. The information includes a data collection mode, related to the target data, in a candidate data collection mode on the data collection interface. The data collection application is set to the data collection mode related to the target data.

According to this embodiment of this application, in response to the trigger operation on the control, the data collection mode related to the target data is obtained through matching on the data collection interface of the data collection application, and the data collection application is set to the data collection mode related to the target data. In this way, the user does not need to perform an operation such as manually switching a mode, so that the application is more intelligent, and more convenience is brought to the user.

In a possible implementation, the data collection application includes a camera. The data collection interface includes a photographing interface of the camera. The obtaining, through matching, information that is on the second interface and that is related to the target data includes: obtaining a photographing mode related to the target data from a candidate photographing mode on the photographing interface of the camera, and setting the camera to the photographing mode related to the target data.

According to this embodiment of this application, the terminal device may automatically set the camera to a photographing mode required by the user, so that the application is more intelligent, and the user may obtain the automatically set camera mode through one operation step, to obtain the target data more conveniently. This avoids complex operations of the user, and improves user experience.

In a possible implementation, the target data includes one or more types of data, for example, a picture, a video, a sound, and a text.

According to this embodiment of this application, end-to-end user experience may be improved in a plurality of scenarios.

In a possible implementation, the obtaining, through matching, information that is on the second interface and that is related to the target data specifically includes: determining an action attribute of the second action corresponding to the control, where the action attribute includes an execution parameter of the second action, and the execution parameter corresponds to the target data; and obtaining, through matching, the information based on the execution parameter.

According to this embodiment of this application, the action attribute of the second action corresponding to the control is determined, and the information is obtained through matching based on the execution parameter. In this way, effect of implementing a plurality of operation steps by the user through one operation step may be implemented. Therefore, an operation of the user is simplified, and the application is more intelligent.

In a possible implementation, the action attribute includes an execution parameter that is preset in an operating system of the terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex SQL parameter, and does not need to invoke, in the function code, an interface of a retrieval function provided in the operating system. Therefore, the operating system may be prevented from exposing an interface externally, and a risk of the operating system being attacked may be reduced. Presetting in the operating system may reduce the risk of the operating system being attacked due to interface exposure.

In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

In a possible implementation, the action attribute includes an execution parameter that is obtained by the terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

Figure 11:
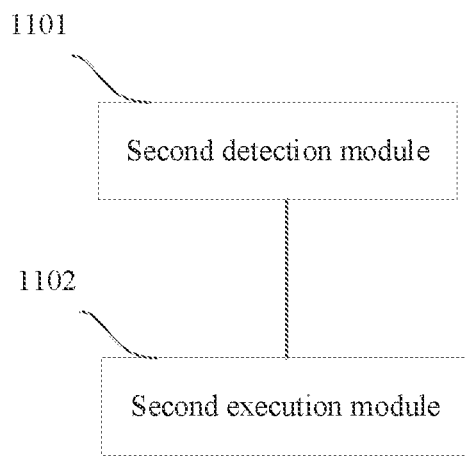
FIG. 11 is a diagram of a structure of an apparatus for performing a control operation according to an embodiment of this application.

FIG. 11 is a diagram of a structure of an apparatus for performing a control operation according to an embodiment of this application. The apparatus is used in a terminal device. As shown in FIG. 11, the apparatus includes:

a second detection module 1101, configured to detect a trigger operation of a user on a control on a first interface of the terminal device, where the control is used to open a second interface; and a second execution module 1102, configured to: in response to the trigger operation of the user, perform a first action and a second action that correspond to the control, where the first action is used to open and display the second interface, and the second action is used to set a display status corresponding to the second interface.

According to this embodiment of this application, the trigger operation of the user on the control on the first interface of the terminal device is detected, and the first action and the second action that correspond to the control are performed in response to the trigger operation of the user. The first action is used to open and display the second interface. The second action is used to set the display status corresponding to the second interface. In this way, the user may obtain a required display status of an interface through only a one-click operation without manual setting. Therefore, a plurality of operation steps are omitted for the user, an application is more intelligent, and user experience is improved.

In a possible implementation, the setting a display status corresponding to the second interface includes: when the second interface is displayed, setting a screen of the terminal device to an eye comfort mode.

According to this embodiment of this application, when the user browses an interface, the terminal device may be automatically switched to the eye comfort mode, and the user does not need to perform manual adjustment when browsing the interface, so that the application is more intelligent, and user experience is improved.

In a possible implementation, the setting a display status corresponding to the second interface includes: when the second interface is displayed, setting a screen of the terminal device to an always-on mode.

According to this embodiment of this application, when the user views an interface, the terminal device may be automatically switched to the always-on mode, and the user does not need to perform a manual operation to prevent the screen from being turned of, so that the application is more intelligent, and user experience is improved.

In a possible implementation, the setting a display status corresponding to the second interface specifically includes: determining an action attribute of the second action corresponding to the control, where the action attribute includes an execution parameter of the second action, and the execution parameter corresponds to the display status; and setting the display status based, on the execution parameter.

According to this embodiment of this application, the action attribute of the second action corresponding to the control is determined, and the display status is set based on the execution parameter, so that after the user opens an interface, the terminal device may automatically set a display status. In this way, effect of implementing a plurality of operation steps by the user through one operation step may be implemented. Therefore, an operation of the user is simplified, and the application is more intelligent.

In a possible implementation, the action attribute includes an execution parameter that is preset in an operating system of the terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex SQL parameter, and does not need to invoke, in the function code, an interface of a retrieval function provided in the operating system. Therefore, the operating system may be prevented from exposing an interface externally, and a risk of the operating system being attacked may be reduced. Presetting in the operating system may reduce the risk of the operating system being attacked due to interface exposure.

In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

In a possible implementation, the action attribute includes an execution parameter that is obtained by the terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

An embodiment of this application further provides a control. The control corresponds to at least a first action attribute and a second action attribute. The first action attribute is used to determine a first action. The second action attribute is used to determine a second action. The first action is used to enter a first interface. In response to a trigger operation of a user on the control, the first action is performed based on the first action attribute, and the second action is performed based on the second action attribute.

According to this embodiment of this application, the user may perform a plurality of operation steps through only a one-click operation, and an application is more intelligent. Therefore, a plurality of operation steps are omitted for the user, and user experience is improved.

The first action attribute may be an original action attribute of the control. The second action attribute may be a new action attribute of the control.

In a possible implementation, the control is used to obtain target data. The second action is used to obtain, through matching after the first interface is entered, information that is on the first interface and that is related to the target data.

According to this embodiment of this application, the user may obtain required information through only a one-click operation, and the application is more intelligent. Therefore, a plurality of operation steps are omitted for the user, and user experience is improved.

In a possible implementation, the second action is used to set a display status corresponding to the first interface after the first interface is entered.

According to this embodiment of this application, the user may obtain a required display status of an interface through only a one-click operation without manual setting. Therefore, a plurality of operation steps are omitted for the user, the application is more intelligent, and user experience is improved.

In a possible implementation, the second action attribute includes an execution parameter of the second action. The execution parameter corresponds to the target data. The obtaining, through matching, information that is on the first interface and that is related to the target data specifically includes: obtaining, through matching, the information based on the execution parameter.

According to this embodiment of this application, the information that is on the first interface and that is related to the target data is obtained through matching based on the execution parameter of the second action in the second action attribute, so that required information may be obtained through matching after the user enters the interface. In this way, effect of implementing a plurality of operation steps by the user through one operation step may be implemented. Therefore, an operation of the user is simplified, and the application is more intelligent.

In a possible implementation, the second action attribute includes an execution parameter of the second action. The execution parameter corresponds to the display status. The setting a display status corresponding to the first interface specifically includes: setting the display status based on the execution parameter.

According to this embodiment of this application, the display status corresponding to the first interface is set based on the execution parameter of the second action in the second action attribute, so that the display status may be automatically set after the user enters the interface. In this way, effect of implementing a plurality of operation steps by the user through one operation step may be implemented. Therefore, an operation of the user is simplified, and the application is more intelligent.

In a possible implementation, the second action attribute includes an execution parameter that is preset in an operating system of a terminal device and that is associated with the control.

According to this embodiment of this application, a specific operation may be implemented more accurately, and for the user, a more accurate operation result may be obtained, thereby improving user experience. In addition, a developer does not need to implement a related method in function code and invoke an interface provided in the operating system. For example, when implementing retrieval, the developer does not need to construct a complex SQL parameter, and does not need to invoke, in the function code, an interface of a retrieval function provided in the operating system. Therefore, the operating system may be prevented from exposing an interface externally, and a risk of the operating system being attacked may be reduced. Presetting in the operating system may reduce the risk of the operating system being attacked due to interface exposure. In addition, a type of the operating system is not limited, so that the method is applicable to a plurality of operating systems, and the developer needs only to preset the action attribute in the operating system but not to pay attention to possible differences between different operating systems and between different versions of interfaces provided by different operating systems and maintain a plurality of sets of code, which may reduce a code maintenance workload of the developer. In addition, presetting in the operating system may further reduce a development workload of the developer for implementing a corresponding action.

In a possible implementation, the second action attribute includes an execution parameter that is obtained by a terminal device on the first interface and that is associated with the control.

According to this embodiment of this application, information may be transferred between controls, so that a function of the control automatically meets a requirement of an interface on which the control is located. A specific action may be implemented with reference to a service scenario, so that the application is more intelligent. In addition, a code amount of a developer may also be reduced even if no execution parameter is preset.

Figure 12:
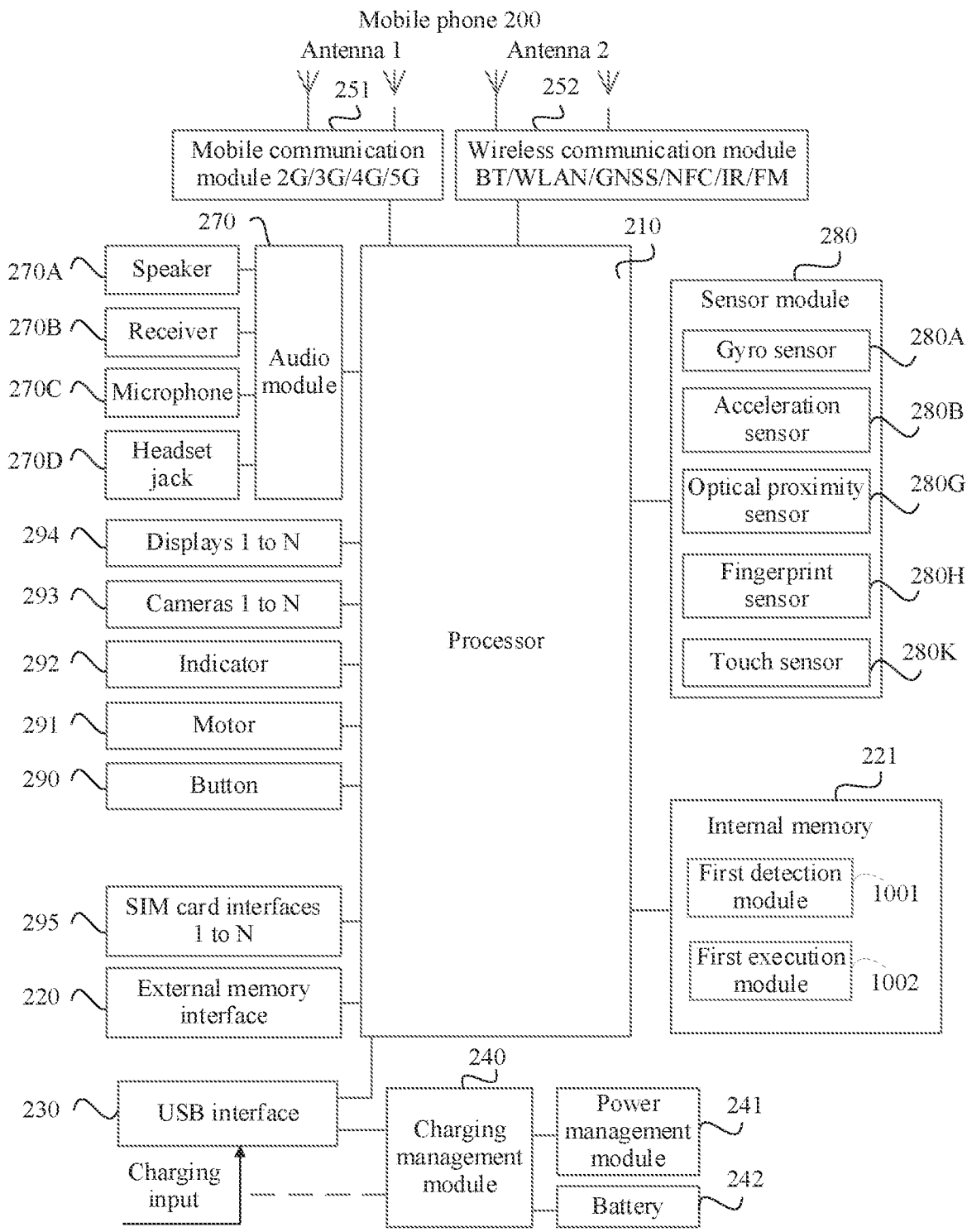
FIG. 12 is a schematic diagram of a structure of a terminal device according to an embodiment of this application.

FIG. 12 is a schematic diagram of a structure of a terminal device according to an embodiment of this application. An example in which the terminal device is a mobile phone is used. FIG. 12 is a schematic diagram of a structure of a mobile phone 200.

The mobile phone 200 may include a processor 210, an external memory interface 220, an internal memory 221, a USB interface 230, a charging management module 240, a power management module 241, a battery 242, an antenna 1, an antenna 2, a mobile communication module 251, a wireless communication module 252, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like. The sensor module 280 may include a gyro sensor 280A, an acceleration sensor 280B, an optical proximity sensor 280G, a fingerprint sensor 280H, and a touch sensor 280K (certainly, the mobile phone 200 may further include other sensors, for example, a temperature sensor, a pressure sensor, a distance sensor, a magnetic sensor, an ambient light sensor, a barometric pressure sensor, and a bone conduction sensor, which are not shown in the figure).

It may be understood that the structure shown in this embodiment of this application does not constitute a specific limitation on the mobile phone 200. In some other embodiments of this application, the mobile phone 200 may include more or fewer components than those shown in the figure, some components may be combined, some components may be split, or different component arrangements may be used.

The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network processing unit, NPU). Different processing units may be separate devices, or may be integrated into one or more processors. The controller may be a nerve center and a command center of the mobile phone 200. The controller may generate an operation control signal based on an instruction operation code and a timing signal, to implement control on instruction fetching and execution.

A memory may further be disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access, reduces waiting time of the processor 210, and improves system efficiency.

The processor 210 may run the method for performing a control operation provided in embodiments of this application, so that the terminal device detects a trigger operation of a user on a control on a first interface of the terminal device, and in response to the trigger operation of the user, performs a first action and a second action that correspond to the control. The first action is used to open and display a second interface. The second action is used to obtain, through matching, information that is on the second interface and that is related to the target data, or is used to set a display status corresponding to the second interface. In this way, the user may obtain required information or a required display status of an interface through only a one-click operation without manual search or setting. Therefore, a plurality of operation steps are omitted for the user, an application is more intelligent, and user experience is improved. The processor 210 may include different components. For example, when a CPU and a GPU are integrated, the CPU and the GPU may cooperate to perform the method for performing a control operation provided in embodiments of this application. For example, in the method for performing a control operation, some algorithms are executed by the CPU, and the other algorithms are executed by the GPU, so that high processing efficiency is achieved.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the mobile phone 200 may include one or N displays 294, where N is a positive integer greater than 1. The display 294 may be configured to display information input by a user or information provided to a user, and various graphical user interfaces (graphical user interface, GUI). For example, the display 294 may, display a photo, a video, a web page, or a file. For another example, the display 294 may display a graphical user interface. The graphical user interface includes a status bar, a navigation bar that can be hidden, a time and weather widget (widget), and an icon of a specific value of a parameter, for example, a browser icon. The status bar includes a name of an operator (for example, China Mobile), a mobile network (for example, 4G), time, and a remaining power. The navigation bar includes an icon of a back (back) button, an icon of a home (home) button, and an icon of a forward button. In addition, it may be understood that, in some embodiments, the status bar may further include a Bluetooth icon, a Wi-Fi icon, an icon of an external device, and the like. It may further be understood that, in some other embodiments, the graphical user interface may further include a dock bar, and the dock bar may include an icon of a frequently-used application, and the like. After detecting a touch event of a user on a specific application icon by using a finger (or a stylus or the like), in response to the touch event, the processor 210 opens a user interface of an application corresponding to the application icon, and displays the user interface of the application on the display 294.

In this embodiment of this application, the display 294 may be an integrated flexible display, or may be a spliced display including two rigid screens and a flexible screen located between the two rigid screens.

When the processor 210 runs the method for performing a control operation provided in embodiments of this application, the terminal device may control, based on the method for performing a control operation provided in embodiments of this application, the display 294 to display a corresponding graphical user interface.

The camera 293 (a front-facing camera, a rear-facing camera, or a camera that may serve as both a front-facing camera and a rear-facing camera) is configured to capture a static image or a video. The camera 293 may generally include a photosensitive element, for example, a lens group and an image sensor. The lens group includes a plurality of lenses (convex lenses or concave lenses), and is configured to: collect an optical signal reflected by a to-be-shot object, and transfer the collected optical signal to the image sensor. The image sensor generates an original image of the to-be-shot object based on the optical signal.

The internal memory 221 may be configured to store computer-executable program code. The executable program code includes instructions. The processor 210 performs various function applications and data processing of the mobile phone 200 by running the instructions stored in the internal memory 221. The internal memory 221 may include a program storage region and a data storage region. The program storage region may store code of an operating system, an application (for example, a camera application or a WeChat application), and the like. The data storage region may store data (for example, an image or a video collected by the camera application) and the like that are created during use of the mobile phone 200.

The internal memory 221 may further store one or more computer programs 1310 corresponding to the method for performing a control operation provided in embodiments of this application. The one or more computer programs 1304 are stored in the memory 221 and configured to be executed by the one or more processors 210. The one or more computer programs 1310 include instructions. The instructions may be used to perform the steps in the embodiments corresponding to FIG. 3 and FIG. 5 to FIG. 9. The computer program 1310 may include a first detection module 1001 and a first execution module 1002. The first detection module 1001 is configured to detect the trigger operation of the user on the control on the first interface of the terminal device. The control is used to obtain the target data. The first execution module 1002 is configured to: in response to the trigger operation of the user, perform the first action and the second action that correspond to the control. The first action is used to open and display the second interface. The second action is used to obtain, through matching, the information that is on the second interface and that is related to the target data. The computer program 1310 may further include a second detection module 1101 and a second execution module 1102. The second detection module 1101 is configured to detect the trigger operation of the user on the control on the first interface of the terminal device. The control is used to open the second interface. The second execution module 1102 is configured to: in response to the trigger operation of the user, perform the first action and the second action that correspond to the control. The first action is used to open and display the second interface. The second action is used to set a display status corresponding to the second interface.

In addition, the internal memory 221 may include a high-speed random access memory, and may further include a non-volatile memory, for example, at least one magnetic disk storage device, a flash memory device, and a universal flash storage (universal flash storage, UFS).

Certainly, code for the method for performing a control operation provided in embodiments of this application may alternatively be stored in an external memory. In this case, the processor 210 may run, by using the external memory interface 220, the code stored in the external memory for the method for performing a control operation.

The following describes functions of the sensor module 280.

The gyro sensor 280A may be configured to determine a motion posture of the mobile phone 200. In some embodiments, angular velocities of the mobile phone 200 around three axes (which are x, y, and z axes) may be determined by using the gyro sensor 280A. To be specific, the gyro sensor 280A may be configured to detect a current motion status of the mobile phone 200, for example, a vibrating state or a static state.

When the display in this embodiment of this application is a folding display, the gyro sensor 280A may be configured to detect a folding or unfolding operation performed on the display 294. The gyro sensor 280A may report the detected folding or unfolding operation as an event to the processor 210, to determine whether the display 294 is in a folded state or an unfolded state.

The acceleration sensor 280B may detect magnitudes of accelerations of the mobile phone 200 in various directions (usually on three axes). To be specific, the gyro sensor 280A may be configured to detect the current motion status of the mobile phone 200, for example, the vibrating state or the static state. When the display in this embodiment of this application is a folding display, the acceleration sensor 280B may be configured to detect a folding or unfolding operation performed on the display 294. The acceleration sensor 280B may report the detected folding or unfolding operation as an event to the processor 210, to determine whether the display 294 is in a folded state or an unfolded state.

The optical proximity sensor 280G may include, for example, a light-emitting diode (LED) and an optical detector, for example, a photodiode. The light-emitting diode may be an infrared light-emitting diode. The mobile phone emits infrared light to the outside by using the light-emitting diode. The mobile phone detects infrared reflected light from a nearby object by using the photodiode. When the detected reflected light is abundant, it may be determined that there is an object near the mobile phone. When the detected reflected light is not so abundant, it may be determined that there is no object near the mobile phone. When the display in this embodiment of this application is a folding display, the optical proximity sensor 280G may be disposed on a first screen of the folding display 294, and the optical proximity sensor 280G may detect a magnitude of a folding angle or an unfolding angle between the first screen and a second screen based on an optical path difference between infrared signals.

The gyro sensor 280A (or the acceleration sensor 280B) may send detected motion status information (for example, the angular velocity) to the processor 210. The processor 210 determines, based on the motion status information, whether the mobile phone is currently in a handheld state or a tripod state (for example, when the angular velocity is not 0, it indicates that the mobile phone 200 is in the handheld state).

The fingerprint sensor 280H is configured to collect a fingerprint. The mobile phone 200 may implement fingerprint-based unlocking, application lock access, fingerprint-based photographing, fingerprint-based call answering, and the like by using a feature of the collected fingerprint.

The touch sensor 280K is also referred to as a "touch panel". The touch sensor 280K may be disposed on the display 294. The touch sensor 280K and the display 294 form a touchscreen, which is also referred to as a "touch screen". The touch sensor 280K is configured to detect a touch operation performed on or near the touch sensor. The touch sensor may transfer the detected touch operation to the application processor, to determine a type of a touch event. A visual output related to the touch operation may be provided on the display 294. In some other embodiments, the touch sensor 280K may alternatively be disposed on a surface of the mobile phone 200 at a location different from that of the display 294.

For example, the display 294 of the mobile phone 200 displays a home screen, and the home screen includes icons of a plurality of applications (for example, the camera application and the WeChat application). The user taps an icon of the camera application on the home screen by using the touch sensor 280K, to trigger the processor 210 to start the camera application and turn on the camera 293. The display 294 displays an interlace of the camera application, for example, a viewfinder interface.

A wireless communication function of the mobile phone 200 may be implemented by using the antenna 1, the antenna 2, the mobile communication module 251, the wireless communication module 252, the modem processor, the baseband processor, and the like.

The antenna 1 and the antenna 2 are configured to transmit and receive electromagnetic wave signals. Each antenna in the mobile phone 200 may be configured to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 251 may provide a solution, applied to the mobile phone 200, to wireless communication including 2G, 3G, 4G, 5G. and the like. The mobile communication module 251 may include at least one filter, a switch, a power amplifier, a low noise amplifier (low noise amplifier, LNA), and the like. The mobile communication module 251 may receive an electromagnetic wave by using the antenna 1, perform processing such as filtering and amplification on the received electromagnetic wave, and transmit a processed electromagnetic wave to the modem processor for demodulation. The mobile communication module 251 may further amplify a signal obtained by the modem processor through modulation, and convert the signal into an electromagnetic wave by using the antenna 1 for radiation. In some embodiments, at least some function modules of the mobile communication module 251 may be disposed in the processor 210. In some embodiments, at least some function modules of the mobile communication module 251 may be disposed in a same component as at least some modules of the processor 210. In this embodiment of this application, the mobile communication module 251 may further be configured to perform information exchange with another terminal device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a, sound signal by using an audio device (not limited to the speaker 270A, the receiver 270B, or the like), or displays an image or a video by using the display 294. In some embodiments, the modem processor may be a separate component. In some other embodiments, the modem processor may be independent of the processor 210 and disposed in a same component as the mobile communication module 251 or another function module.

The wireless communication module 252 may provide a solution, applied to the mobile phone 200, to wireless communication including a wireless local area network (wireless local area network, WLAN) (for example, a wireless fidelity (wireless fidelity, Wi-Fi) network). Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 252 may be one or more components integrating at least one communication processing module. The wireless communication module 252 receives an electromagnetic wave by using the antenna. 2, performs frequency modulation and filtering processing on an electromagnetic wave signal, and sends a processed signal to the processor 210. The wireless communication module 252 may further receive a to-be-sent signal from the processor 210, perform frequency modulation and amplification on the signal, and convert the signal into an electromagnetic wave by using the antenna 2 for radiation. In this embodiment of this application, the wireless communication module 252 is configured to transmit data with another terminal device under control of the processor 210.

In addition, the mobile phone 200 may implement, by using the audio module 270, the speaker 270A, the receiver 270B, the microphone 270C, the headset jack 270D, the application processor, and the like, an audio function, for example, music playing and recording. The mobile phone 200 may receive an input from the button 290, and generate a button signal input related to a user setting and function control of the mobile phone 200. The mobile phone 200 may generate a vibration prompt (for example, an incoming call vibration prompt) by using the motor 291. The indicator 292 in the mobile phone 200 may be an indicator light, may be configured to indicate a charging status and a power change, and may further be configured to indicate a message, a missed call, a notification, and the like. The SIM card interface 295 in the mobile phone 200 is configured to be connected to a SIM card. The SIM card may be inserted into the SIM card interface 295 or removed from the SIM card interface 295, to implement contact with or separation from the mobile phone 200.

It should be understood that in actual application, the mobile phone 200 may include more or fewer components than those shown in FIG. 12. This is not limited in this embodiment of this application. The mobile phone 200 shown in the figure is merely an example. The mobile phone 200 may have more or fewer components than those shown in the figure, two or more components may be combined, or different component configurations may be used. Various components shown in the figure may be implemented by using hardware including one or more signal processors and/or application-specific integrated circuits, software, or a combination of hardware and software.

A software system of the terminal device may use a layered architecture, an event-driven architecture, a microkernel architecture, a micro service architecture, or a cloud architecture. In this embodiment of this application, an Android system of the layered architecture is used as an example to describe a software structure of the terminal device.

Figure 13:
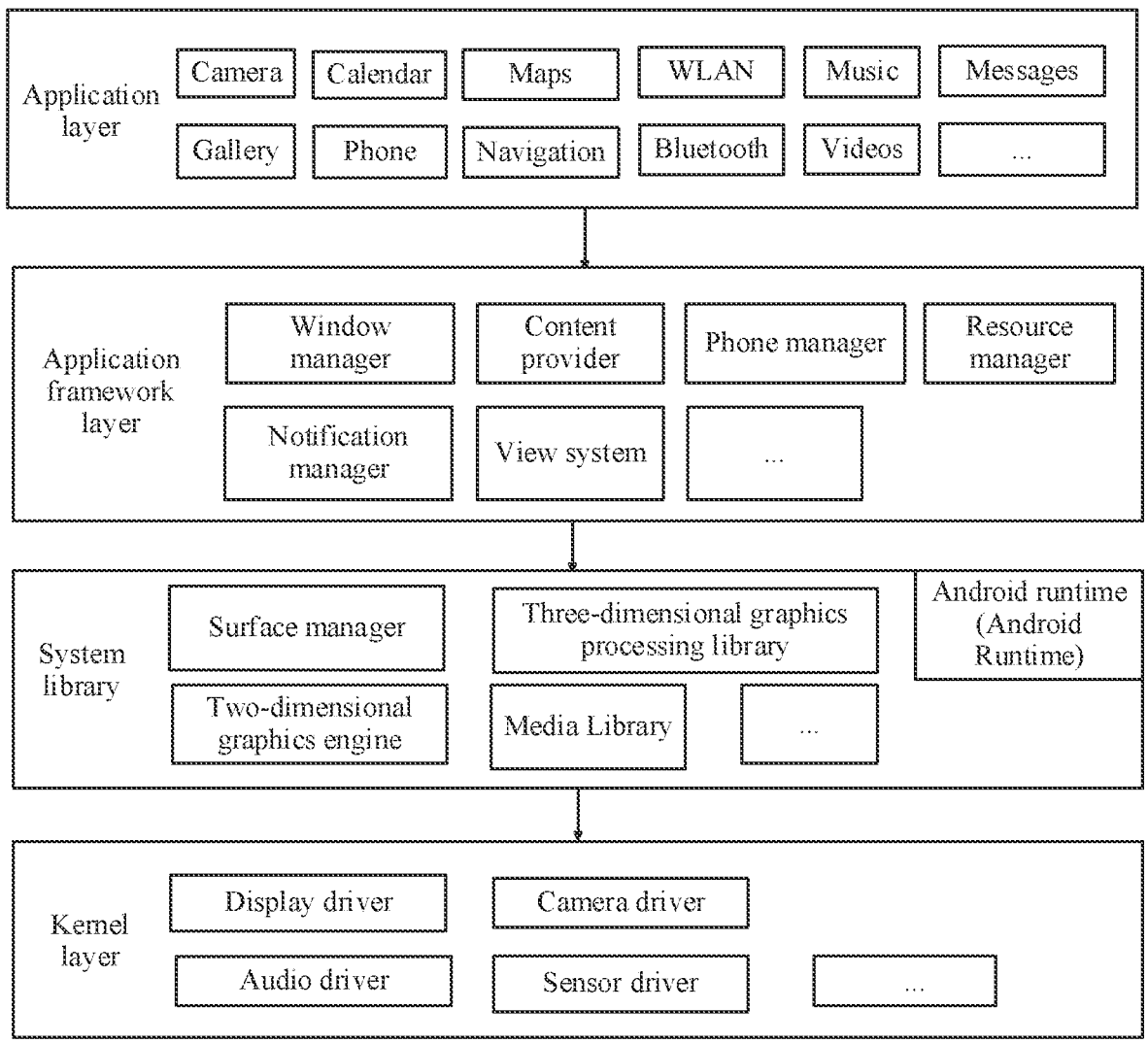
FIG. 13 is a block diagram of a software structure of a terminal device according to an embodiment of this application.

FIG. 13 is a block diagram of a software structure of a terminal device according to an embodiment of this application.

Software is divided into several layers by using the layered architecture, and each layer has a clear role and task. The layers communicate with each other by using a software interface. In some embodiments, the Android system is divided into four layers: an application layer, an application framework layer, an Android runtime (Android runtime) and system library layer, and a kernel layer from top down.

The application layer may include a series of application packages.

As shown in FIG. 13, the application packages may include applications such as Phone, Camera. Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 13, the application framework layer may include a window manager, a content provider, a view system, a phone manager, a resource manager, a notification manager, and the like.

The window manager is configured to manage a window program. The window manager may obtain a display size, determine whether there is a status bar, lock a screen, take a screenshot, and the like. The window manager may further be configured to detect whether there is a control operation in this embodiment of this application, such as a control tapping operation or a control sliding operation.

The content provider is configured to: store and obtain data, and make the data accessible to an application. The data may include a video, an image, audio, calls that are made and received, browsing history and bookmarks, a phonebook, and the like.

The view system includes visual controls such as a control for displaying a text and a control for displaying a picture. The view system may be configured to construct an application. A display interface may include one or more views. For example, a display interface including a message notification icon may include a view for displaying a text and a view for displaying a picture.

The phone manager is configured to provide a communication function of the terminal device, for example, management of a call status (including answering, declining, and the like).

The resource manager provides various resources for applications, for example, localized strings, icons, images, layout files, and video files.

The notification manager enables an application to display notification information in the status bar, which may be used to convey a notification-type message and may automatically disappear after a short stay without user interaction. For example, the notification manager is configured to notify download completion and provide a message notification. The notification manager may alternatively be a notification that appears in the status bar at the top of the system in a form of a chart or a scroll bar text, for example, a notification for an application running in the background, or may be a notification that appears on the screen in a form of a dialog window. For example, text information is displayed in the status bar, an announcement is given, the terminal device vibrates, or an indicator light blinks.

The Android runtime includes a kernel library and a virtual machine. The Android runtime is responsible for scheduling and management of the Android system.

The kernel library includes two parts: one part is a function that needs to be invoked by a Java language, and the other part is a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of common audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An embodiment of this application provides an apparatus for performing a control operation, including a processor and a memory configured to store instructions executable by the processor. The processor is configured to: when executing the instructions, implement the foregoing method.

An embodiment of this disclosure provides a non-volatile computer-readable storage medium. The non-volatile computer-readable storage medium stores computer program instructions. When the computer program instructions are executed by a processor, the foregoing method is implemented.

An embodiment of this application provides a computer program product including computer-readable code or a non-volatile computer-readable storage medium carrying computer-readable code. When the computer-readable code runs in a processor of an electronic device, the processor in the electronic device performs the foregoing method.

The computer-readable storage medium may be a tangible device capable of retaining and storing instructions for use by an instruction execution device. The computer-readable storage medium may be, for example, but is not limited to an electrical storage device, a magnetic storage device, an optical storage device, an electromagnetic storage device, a semiconductor storage device, or any suitable combination thereof. More specific examples (non-exhaustive list) of the computer-readable storage medium include a portable computer disk, a hard disk, a random access memory (Random Access Memory, RAM), a read-only memory (Read-Only Memory, ROM), an erasable programmable read-only memory (Electrically Programmable Read-Only Memory, EPROM) (or a flash memory), a static random access memory (Static Random Access Memory, SRAM), a portable compact disc read-only memory (Compact Disc Read-Only Memory, CD-ROM), a digital multi-function disk (Digital Video Disc, DVD), a memory stick, a floppy disk, a mechanical coding device such as a punched card or a groove inward-protruding structure that stores instructions, and any suitable combination thereof.

The computer-readable program instructions or code described herein may be downloaded from the computer-readable storage medium to each computing/processing device or downloaded, through a network such as the internet, a local area network, a wide area network, and/or a wireless network, to an external computer or external storage device. The network may include copper transmission cables, optical fiber transmission, wireless transmission, routers, firewalls, switches, gateway computers, and/or edge servers. A network adapter card or network interface in each computing/processing device receives the computer-readable program instructions from the network, and forwards the computer-readable program instructions for storage in a computer-readable storage medium in each computing/processing device.

The computer program instructions used to perform operations in this application may be assembly instructions, an instruction set architecture (instruction Set Architecture, ISA) instruction, a machine instruction, a machine-related instruction, microcode, a firmware instruction, status setting data, or source code or target code written in any combination of one or more programming languages. The programming languages include an object-oriented programming language such as Smalltalk and C++, and a conventional procedural programming language such as a "C" language or a similar programming language. The computer-readable program instructions may be executed entirely on a user computer, partly on a user computer, as a stand-alone software package, partly on a user computer and partly on a remote computer, or entirely on a remote computer or a server. When a remote computer is involved, the remote computer may be connected to a user computer through any type of network, including a local area network (Local Area Network, LAN) or a wide area network (Wide Area Network, WAN), or may be connected to an external computer (for example, connected by using an internet service provider through the internet). In some embodiments, an electronic circuit, for example, a programmable logic circuit, a field-programmable gate array (Field-Programmable Gate Array, FPGA), or a programmable logic array (Programmable Logic Array, PLA), is customized by using status information of the computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block of the flowcharts and/or the block diagrams and a combination of blocks in the flowcharts and/or the block diagrams may be implemented by using the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

The computer-readable program instructions may alternatively be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implement functions/actions specified in one or more blocks in the flowcharts and/or the block diagrams.

The flowcharts and the block diagrams in the accompanying drawings illustrate possible system architectures, functions, and operations of the apparatus, the system, the method, and the computer program product according to a plurality of embodiments of this application. In this regard, each block in the flowcharts or the block diagrams may represent a part of a module, a program segment, or an instruction. The part of the module, the program segment, or the instruction includes one or more executable instructions for implementing a specified logical function. In some alternative implementations, functions marked in the blocks may occur in a sequence different from that marked in the accompanying drawings. For example, two consecutive blocks may actually be executed substantially in parallel, or may sometimes be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or other units may implement several functions enumerated in the claims. Some measures are described in dependent claims that are different from each other, but this does not mean that these measures cannot be combined to produce a better effect.

The foregoing has described embodiments of this application. The foregoing descriptions are merely examples, and are not exhaustive and not limited to the disclosed embodiments. Many modifications and variations are apparent to a person of ordinary skill in the art without departing from the scope and spirit of the described embodiments. Selection of terms used in this specification is intended to best explain principles of embodiments, actual application, or improvements to technologies in the market, or to enable another person of ordinary skill in the art to understand embodiments disclosed in this specification.

What is claimed is:

1. An electronic device, comprising:
a memory configured to store instructions; and
one or more processors coupled to the memory and configured to execute the instructions to cause the electronic device to:
display a first interface that includes an instruction to obtain target data;
detect a trigger operation of a user on a control on the first interface;
display, in response to the trigger operation of the user, a second interface;
select, through a matching of the target data associated with the control and from among multiple data items, candidate information that is related to the target data and includes one or more data items of the multiple data items; and
display, on the second interface, the candidate information that includes the one or more data items of the multiple data items and additional data items of the multiple data items.

2. The electronic device according to claim 1, wherein the second interface comprises a data browsing interface, wherein the candidate information comprises data that is part of collected data displayed on the data browsing interface, and wherein the data is highlighted on the data browsing interface.

3. The electronic device according to claim 2, wherein the data browsing interface comprises a gallery browsing interface, and wherein the one or more processors are further configured to execute the instructions to cause the electronic device to obtain a first picture related to the target data from a plurality of pictures stored in the electronic device.

4. The electronic device according to claim 3, wherein the target data corresponds to a type of picture.

5. The electronic device according to claim 3, wherein the target data corresponds to a type of content contained in a picture.

6. The electronic device according to claim 3, wherein after selecting the candidate information, the one or more processors are further configured to execute the instructions to cause the electronic device to display a picture in a top part of the gallery browsing interface.

7. The electronic device according to claim 1, wherein the target data comprises one or more of a picture, a video, a sound, or a text.

8. The electronic device according to claim 1, wherein the one or more processors are further configured to execute the instructions to cause the electronic device to:
   identify an action attribute of an action corresponding to the control, wherein the action attribute comprises an execution parameter of the action, and wherein the execution parameter corresponds to the target data; and
   further obtain the candidate information based on the execution parameter.

9. The electronic device according to claim 8, wherein the execution parameter is preset in an operating system of the electronic device and is associated with the control.

10. The electronic device according to claim 8, wherein the one or more processors are further configured to execute the instructions to cause the electronic device to obtain the execution parameter from the first interface, and wherein the execution parameter is associated with the control.

11. The electronic device according to claim 1, wherein selecting the candidate information comprises automatically selecting the candidate information.

12. An electronic device, comprising:
   a memory configured to store instructions; and
   one or more processors coupled to the memory and configured to execute the instructions to cause the electronic device to:
      display a first interface that includes an instruction to obtain target data;
      detect a trigger operation of a user on a control on the first interface, wherein the control is configured to open a second interface;
      perform, in response to the trigger operation, a first action that is configured to open and display the second interface; and
      perform, in response to the trigger operation, a second action that automatically selects, from among multiple display statuses, a display status that specifies a collection mode that is based on the target data and that is configured to collect the target data.

13. The electronic device according to claim 12, wherein the electronic device further comprises a screen, and wherein the one or more processors are further configured to execute the instructions to cause the electronic device to set the screen to an eye comfort mode when the second interface is displayed.

14. The electronic device according to claim 12, wherein the electronic device further comprises a screen, and wherein the one or more processors are further configured to execute the instructions to cause the electronic device to set the screen to an always-on mode when the second interface is displayed.

15. The electronic device according to claim 12, wherein the one or more processors are further configured to execute the instructions to cause the electronic device to:
   identify an action attribute of the second action corresponding to the control, wherein the action attribute comprises an execution parameter of the second action, and wherein the execution parameter corresponds to the display status,
   wherein selecting the display status is based on the execution parameter.

16. The electronic device according to claim 15, wherein the execution parameter is preset in an operating system of the electronic device and is associated with the control.

17. The electronic device according to claim 15, wherein the one or more processors are further configured to execute the instructions to cause the electronic device to obtain the execution parameter from the first interface, and wherein the execution parameter is associated with the control.

18. The electronic device according to claim 12, wherein the second interface is a data collection interface that is configured to capture a data item that is related to the target data, wherein data collection interface is a camera interface, and wherein the display status that specifies the collection mode comprises an image capture mode of the camera interface.

19. A method implemented by an electronic device, wherein the method comprises:
   displaying a first interface that comprises a control and that comprises an instruction to obtain target data;
   detecting a trigger operation on the control that is configured to display a second interface;
   obtaining the target data from the first interface;
   selecting, through a matching of the target data and from among multiple pictures, candidate pictures that are related to the target data;
   retrieving the candidate pictures that are related to the target data; and
   displaying, in the second interface and in response to the trigger operation, the candidate pictures that are related to the target data and additional pictures of the multiple pictures.

20. The method according to claim 19, wherein the method further comprises displaying the candidate pictures in a top part of the second interface.

* * * * *